US008768046B2

(12) United States Patent
Ernst et al.

(10) Patent No.: US 8,768,046 B2
(45) Date of Patent: Jul. 1, 2014

(54) DETERMINING MODEL PARAMETERS BASED ON TRANSFORMING A MODEL OF AN OBJECT

(71) Applicant: Fraunhofer-Gesellschaft zur Foerderung der angewandten Forschung e.V., Munich (DE)

(72) Inventors: Andreas Ernst, Weiden (DE); Tobias Ruf, Burgau (DE); Felix Lautenschlager, Abensberg (DE); Anton Papst, Fuerth (DE); Joem Thielecke, Erlangen (DE); Christian Kueblbeck, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/970,986

(22) Filed: Aug. 20, 2013

(65) Prior Publication Data
US 2013/0336583 A1    Dec. 19, 2013

Related U.S. Application Data

(63) Continuation of application No. PCT/EP2012/052798, filed on Feb. 17, 2012.

(60) Provisional application No. 61/446,668, filed on Feb. 25, 2011.

(51) Int. Cl.
*G06K 9/00*    (2006.01)

(52) U.S. Cl.
USPC .......................................................... 382/154

(58) Field of Classification Search
USPC .......................................................... 382/154
See application file for complete search history.

(56) References Cited

U.S. PATENT DOCUMENTS

| 4,783,829 A * | 11/1988 | Miyakawa et al. | 382/199 |
| 6,128,405 A * | 10/2000 | Fujii | 382/154 |
| 2004/0190766 A1* | 9/2004 | Watanabe et al. | 382/154 |

(Continued)

FOREIGN PATENT DOCUMENTS

EP    1 667 068 A1    6/2006

OTHER PUBLICATIONS

Official Communication issued in International Patent Application No. PCT/EP2012/052798, mailed on May 25, 2012.

(Continued)

*Primary Examiner* — Alex Liew
(74) *Attorney, Agent, or Firm* — Keating & Bennett, LLP

(57) ABSTRACT

Apparatus for determining model parameters, the apparatus comprising an object model transformer, a region comparator, and a model parameter determiner. The object model transformer is configured to receive an object model of a known object and to transform the object model based on a set of model parameters from a first frame of reference to a second frame of reference, and is further configured to determine as result of this transformation a transformed object model comprising at least one region that is associated to an object region of the object. The region comparator is configured to receive the transformed object model and an image depicting the object, to determine for a selected region of the transformed object model a region-related similarity measure. The model parameter determiner is configured to determine an updated set of model parameters on the basis of the region-related similarity measure and an optimization scheme.

32 Claims, 24 Drawing Sheets

(56) References Cited

U.S. PATENT DOCUMENTS

| | | |
|---|---|---|
| 2006/0088203 A1 | 4/2006 | Boca et al. |
| 2006/0140473 A1* | 6/2006 | Brooksby et al. ............ 382/154 |
| 2010/0232647 A1 | 9/2010 | Fujieda et al. |

OTHER PUBLICATIONS

Loeckx et al., "Temporal subtraction of thorax CR images using statistical deformation model", IEEE Transactions on medical imaging, IEEE Service center, Piscataway, NJ, US, vol. 22, No. 11, Nov. 1, 2003, pp. 1490-1504.
Farin, "Efficient Computation of Homographies From Four Correspondences," Autom. Video Segm. Employing Object/Camera Modeling Techn., pp. 479-482.
Wagner et al., "ARToolKitPlus for Pose Tracking on Mobile Devices," Computer Vision Winter Workshop 2007, Feb. 6-8, 2007, 8 pages.
Kato et al., "Marker Tracking and HMD Calibration for a Video-based Augmented Reality Conferencing System," 10 pages.
Madsen et al., "Methods for Non-Linear Least Squares Problems," Informatics and Mathematical Modelling, Apr. 2004, 30 pages.
Pham et al., "Fast Polygonal Integration and Its Application in Extending Haar-like Features to Improve Object Detection," In Proceedings of the IEEE Conference on Computer Vision and Pattern Recognition (CVPR), 2010, 8 pages.
Wang et al., "Shape and Appearance Context Modeling," 8 pages.
Foley, "Computer Graphics Principles and Practice," 4 pages.
Hartley, "Multiple View Geometry in Computer Vision," 6 pages.
Press, "Numerical Recipes in CPP," Chapter 15, pp. 688-695.
Nelder et al., "A Simplex Method for Function Minimization," pp. 308-313.
Tajbakhsh et al., "Semiautomatic Color Checker Detection in Distorted Images," Proceedings of the Fifth Lasted International Conference Signal Processing, Pattern Recognition, and Applications, Feb. 13-15, 2008, pp. 347-352.
Crow, "Summed-Area Tables for Texture Mapping," Computer Graphics, vol. 18, No. 3, Jul. 1984, pp. 207-212.
Kapusi et al., "Simultaneous Geometric and Colorimetric Camera Calibration," Workshop Farbbildverarbeitung 2010, Oct. 7, 2010, pp. 1-15.
Chesnaud et al., "Statistical Region Snake-Based Segmentation Adapted to Different Physical Noise Models," IEEE Transactions on Pattern Analysis and Machine Intelligence, vol. 21, No. 11, Nov. 1999, pp. 1145-1157.
Viola et al., "Rapid Object Detection Using a Boosted Cascade of Simple Features," Accepted Conference on Computer Vision and Pattern Recognition 2001, pp. 1-9.
"Tracking and Motion," Chapters 10-12, pp. 316-405.
Finlayson et al., "Color by Correlation: A Simple, Unifying Framework for Color Constancy," IEEE Transactions on Pattern Analysis and Machine Intelligence, vol. 23, No. 11, Nov. 2001, pp. 1209-1221.
Devernay et al., "Automatic Calibration and Removal of Distortion from Scenes of Structured Environments," Investigative and Trial Image Processing 2567, 1995, 11 pages.
Hartley et al., "Multiple View Geometry in Computer Vision," Second Edition, 48 pages.
El-Melegy et al., "Nonmetric Lens Distortion Calibration: Closed-form Solutions, Robust Estimation and Model Selection," 6 pages.
Lam et al., "Automatic White Balancing Using Luminance Component and Standard Deviation of RGB Components," pp. III-493 to III-496.
Johnson et al., "Exposing Digital Forgeries Through Chromatic Aberration," 8 pages.
Hemayed, "A Survey of Camera Self-Calibration," Proceedings of the IEEE Conference on Advanced Video and Signal Based Surveillance (AVSS'03), 2003, 7 pages.
Harltey, "Estimation of Relative Camera Positions for Uncalibrated Cameras," 9 pages.
Jackowski et al., "Correcting the Geometry and Color of Digital Images," IEEE Transactions on Pattern Analysis and Machine Intelligence, vol. 19, No. 10, Oct. 1997, pp. 1152-1158.
Cipolla et al., "Camera Calibration from Vanishing Points in Images of Architectural Scenes," pp. 382-391.
Zhang, "Flexible Camera Calibration by Viewing a Plane from Unknown Orientations," 8 pages.
Zhang, "Camera Calibration with One-Dimensional Objects," IEEE Transactions on Pattern Analysis and Machine Intelligence, vol. 26, No. 7, Jul. 2004, pp. 892-899.
Zhang et al., "Camera Calibration with Lens Distortion from Low-rank Textures," 9 pages.
Zheng et al., "Single-Image Vignetting Correction," IEEE Transactions on Pattern Analysis and Machine Intelligence, pp. 1-14.
Han et al., "Robust Observations for Object Tracking," 4 pages.
Lam, "Combining Gray World and Retinex Theory for Automatic White Balance in Digital Photography," pp. 134-139.
Mohr et al., "Fast Adaptive Silhouette Area Based Template Matching," Ifl Technical Report Series, 21 pages.
Yin et al., "Object Tracking and Detection after Occlusion via Numerical Hybrid Local and Global Mode-Seeking," 8 pages.
Longuet-Higgins, "A Computer Algorithm for Reconstructing a Scene from Two Projections," Nature, vol. 293, Sep. 10, 1981, pp. 133-135.
Baker et al., "Lucas-Kanade 20 Years on: A Unifying Framework," Carnegie Mellon University Research Showcase, 53 pages.
Viola et al., "Rapid Object Detection Using a Boosted Cascade of Simple Features," IEEE Computer Society Conference on Computer Vision and Pattern Recognition, May 2004, 13 pages.
Luhmann et al., "Modelling of Chromatic Aberration for High Precision Photogrammetry," IAPRS, vol. XXXVI, Part 5, Sep. 25-27, 2006, pp. 173-178.
Nikitenko et al., "Applicability of White-Balancing Algorithms to Restoring Faded Colour Slides: An Empirical Evaluation," Journal of Multimedia, vol. 3, No. 5, Dec. 2008, pp. 9-18.
Peng et al., "RASL: Robust Alignment by Sparse and Low-Rank Decomposition for Linearly Correlated Images," 2010, IEEE, 8 pages.
Yilmaz et al., "Object Tracking: A Survey," ACM Computing Surverys, vol. 38, No. 4, 2006, 31 pages.
Triggs, "Autocalibration from Planar Scenes," European Conference on Computer Vision (ECCV'98), 1998, 20 pages.
Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.
Weng et al., "A Novel Automatic White Balance Method for Digital Still Cameras," pp. 3801-3804.

* cited by examiner

——— : transformed calibration chart model

— — — : camera image

— · — : selected region/image section

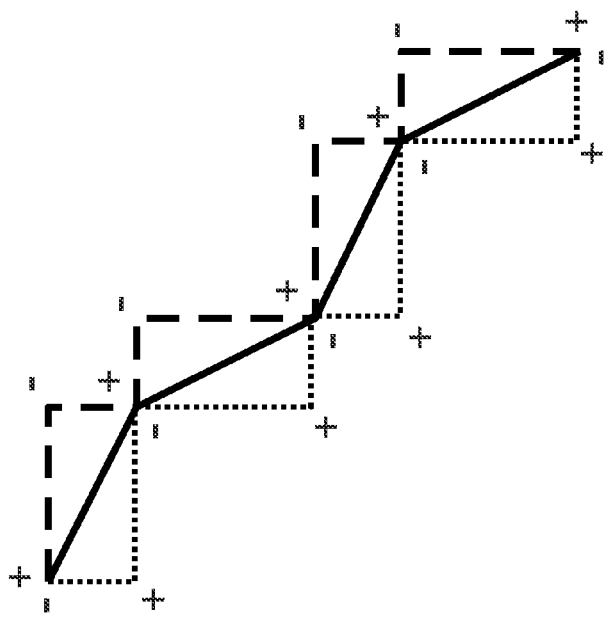
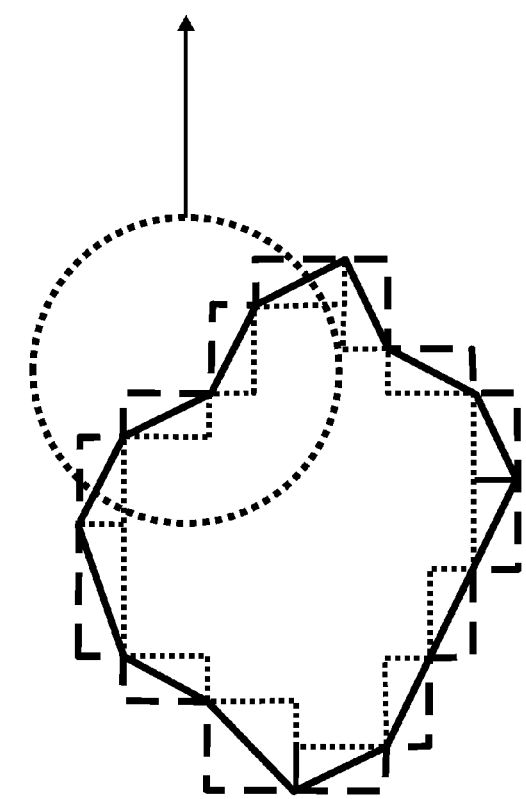
FIG 9

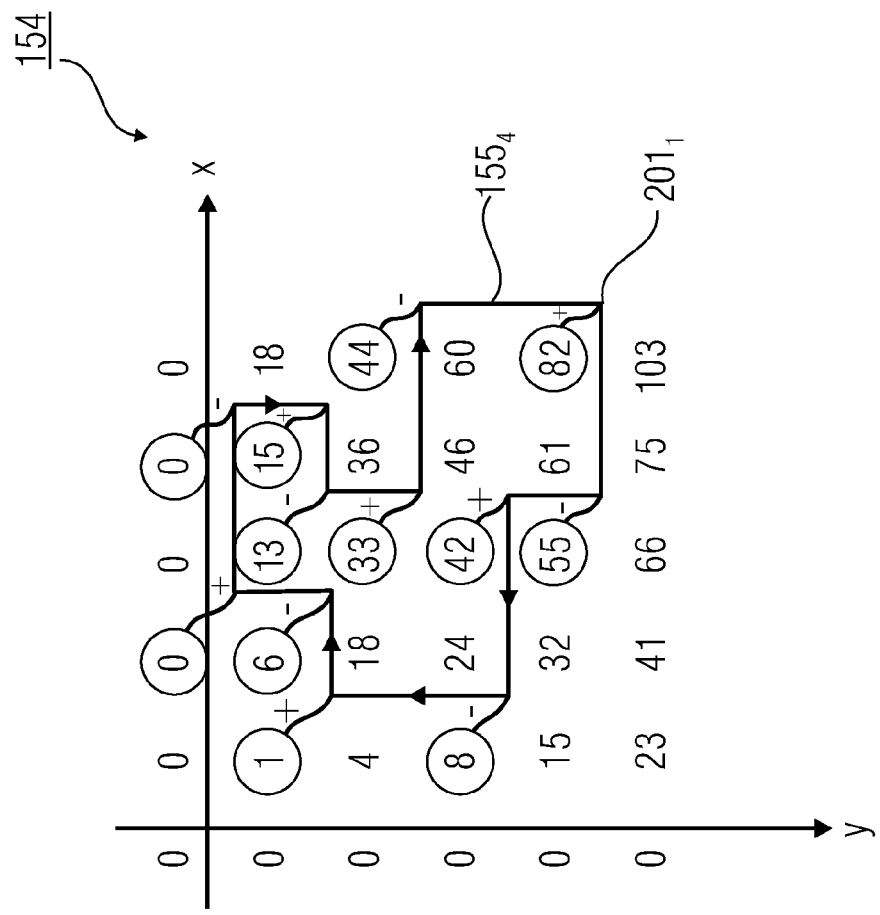
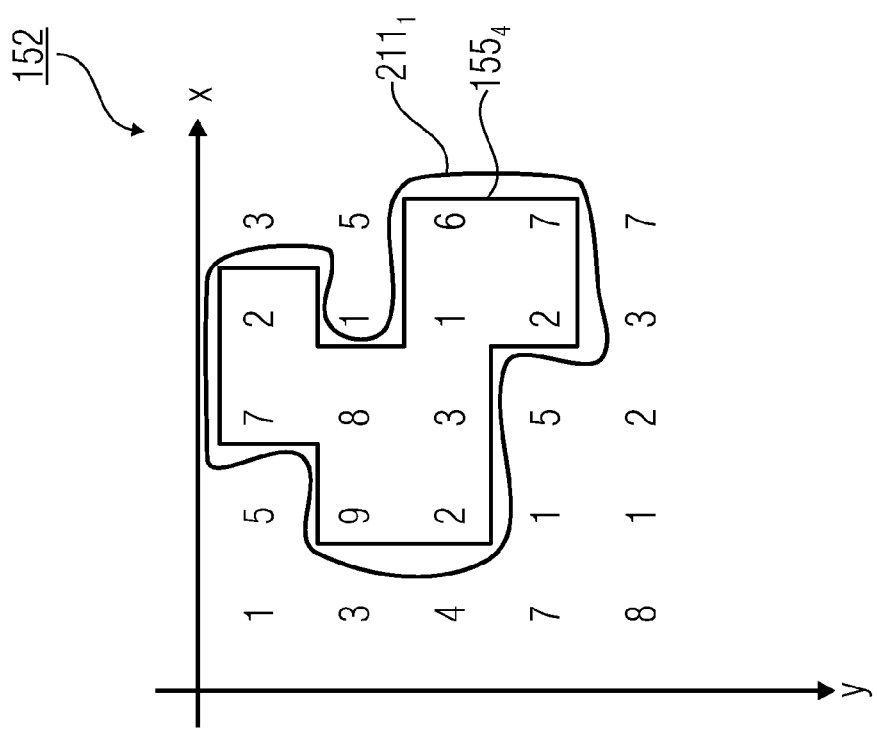
FIG 13B

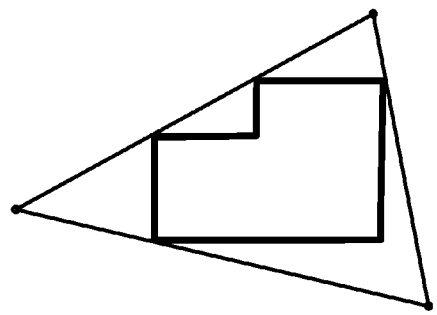
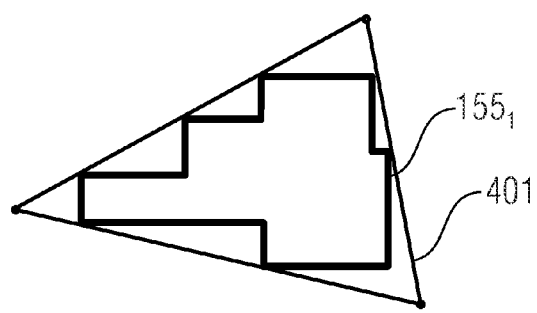
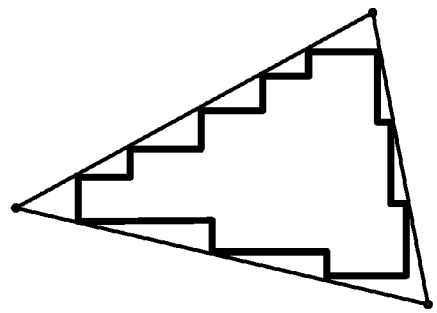
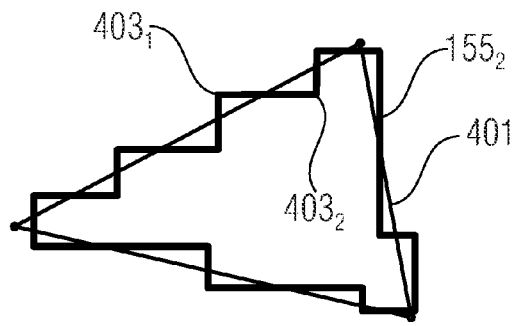
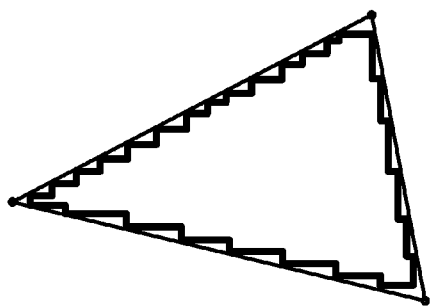
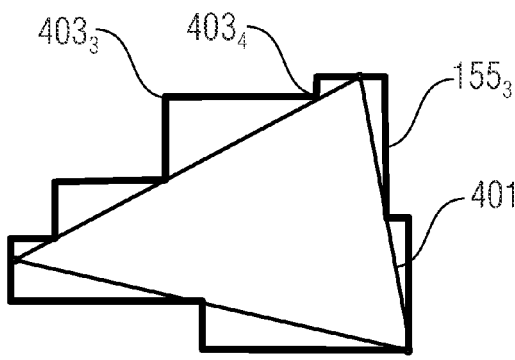
different precisions          inner, mean and outer
FIG 15A          FIG 15B

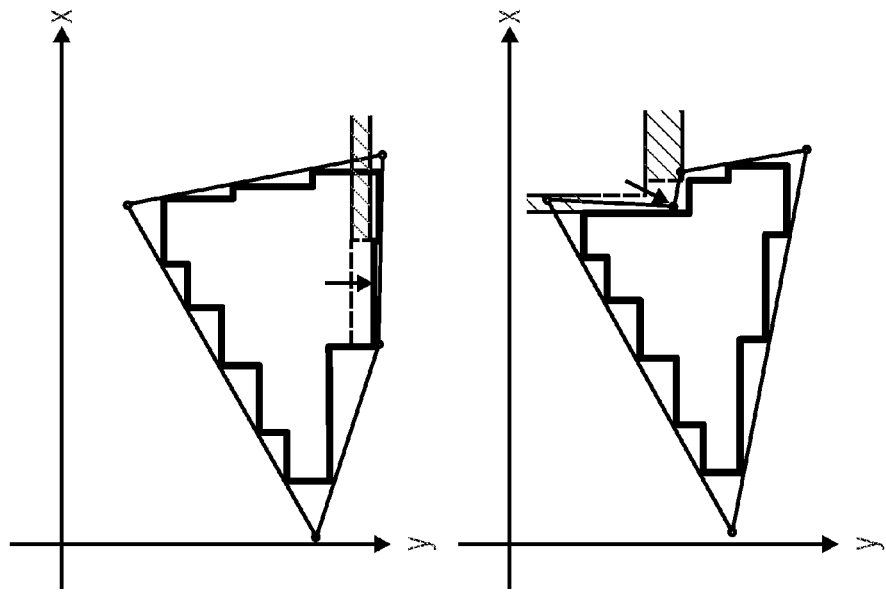
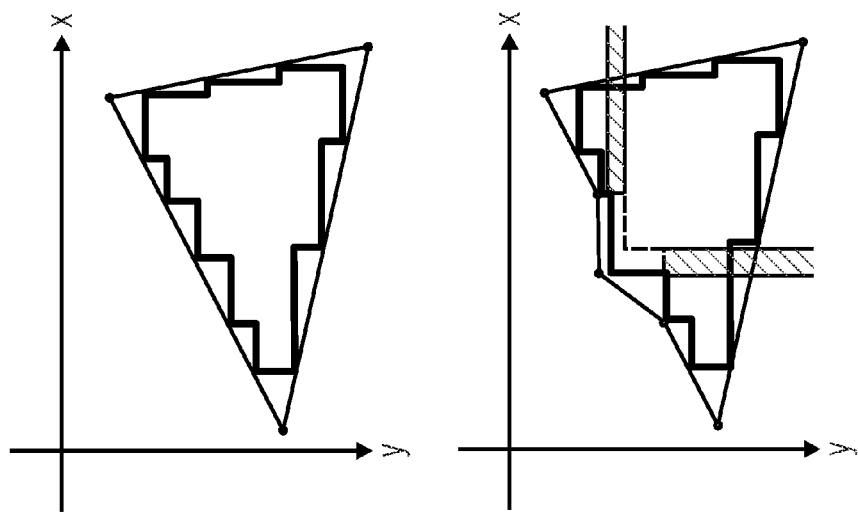
FIG 16

```
bool L[#columns bounding box] = { FALSE };
for ( i = 0; i < #rows bounding box; ++i )
{
   bool FirstSign = FALSE;
   bool PlusSection = FALSE;
   bool MinusSection = FALSE;

for( j = 0; j < #columns bounding box; ++j)
   {
      if( IsPositionMarked( i, j, '+' ) )
      {
         FirstSign = !FirstSign;
         PlusSection = FirstSign;
         MinusSection = False;
      }
      else if( IsPositionMarked( i, j, '-' ) )
      {
         FirstSign = !FirstSign;
         MinusSection = FirstSign;
         PlusSection = False;
      }
      bool mark = PlusSection ||
            !MinusSection && !PlusSection && L ( j );
      L ( j ) = mark;

if( mark )
      {
         // do something e.g. label the pixel
         count << "(" << i << "," << j <<")" << endl;
      }
   }
}
```

FIG 18

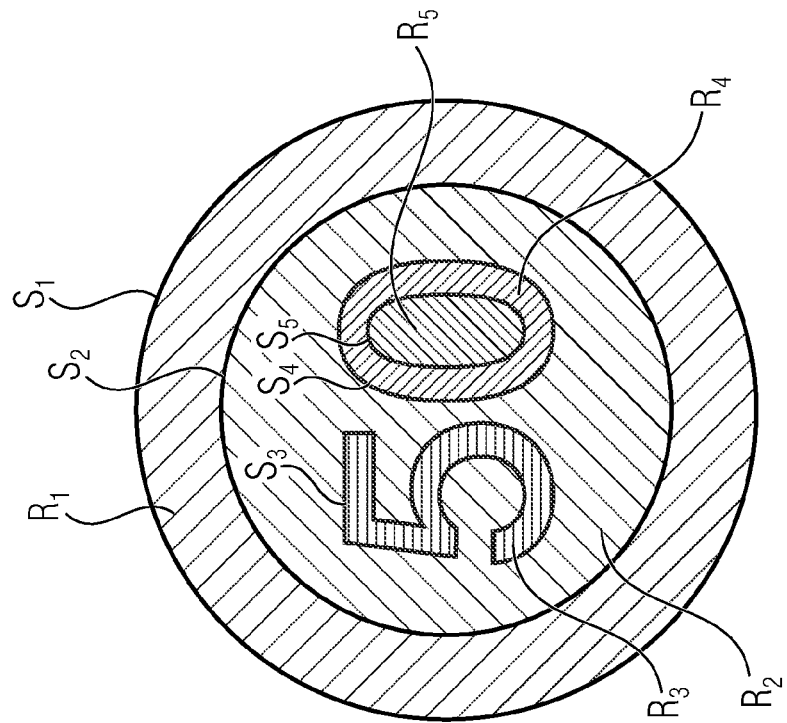
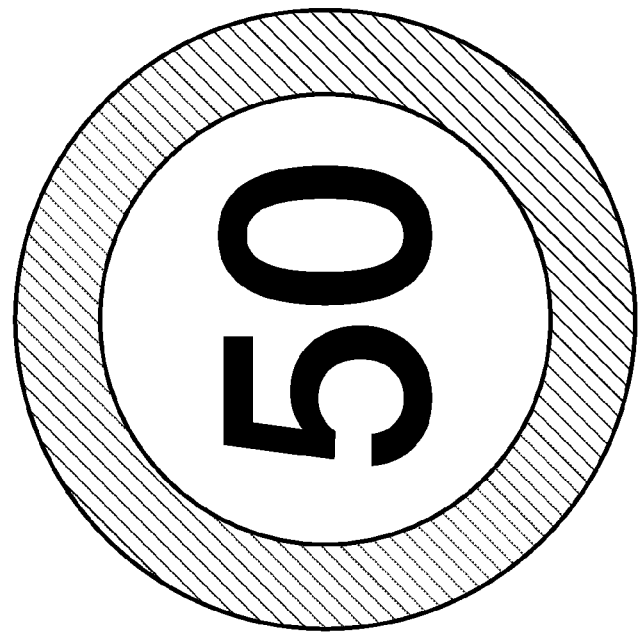
FIG 19

DETERMINING MODEL PARAMETERS BASED ON TRANSFORMING A MODEL OF AN OBJECT

CROSS-REFERENCE TO RELATED APPLICATIONS

This application is a continuation of copending International Application No. PCT/EP2012/052798, filed Feb. 17, 2012, which is incorporated herein by reference in its entirety, and additionally claims priority from U.S. Application No. 61/446,668, filed Feb. 25, 2011, which is also incorporated herein by reference in its entirety.

BACKGROUND OF THE INVENTION

Embodiments of the present invention relate to an apparatus for determining model parameters. Some embodiments relate to a method for determining model parameters. Some embodiments relate to a region-based object detection and tracking framework. Some embodiments relate to a model parameter determination based on matching regions. Some embodiments relate to a unified Color and Geometric Camera Calibration Framework. A calibration framework is described that allows individual or simultaneous geometric and/or color calibration of cameras in a highly efficient, robust and unified way.

In this section a short overview over the state of the art of camera calibration algorithms will be given. Under camera calibration we understand a process of estimating geometric and/or colorimetric properties of a camera.

Geometric calibration can be divided in two parts: estimating the inner and the outer orientation. The inner orientation describes how light waves are projected from 3-D world through the optical lens system onto the 2-D image sensor. Inner orientation is given by a 3×3 upper triangular matrix (also called intrinsic camera matrix) which describes the geometric projection of light. Due to inaccuracies of lens and image sensor additional geometric distortions can appear in the image, whereby pixels are displaced related to their ideal positions. These distortions are described through so called lens distortion coefficients. Outer orientation (also called extrinsic camera parameters) describes the position of the camera in the world and is given by a rotation matrix and translation vector. This position can be either relative to a given world coordinates system or with respect to some calibration pattern or another camera.

There are several generally different approaches to estimate the geometrical distortion and inner orientation parameters. A widely used class uses some kind of specially designed calibration object with a-priori known geometry (see references [2, 24, 21] indicated in list at end of this description). Such a calibration object can be a 2-D plane [24], a 3-D object [21], or 1-D object [25]. The second class of algorithms tries to analyze the scene in order to extract some potentially distorted geometric features such as straight lines, or right angles and to use these geometric information for camera calibration [8, 3, 4, 5]. A relatively recent approach tries to utilize the symmetry information contained in many artificial and natural objects. A transformation for the observed (mostly planar) object of interest is calculated which brings it in the most symmetric representation [26, 19]. The last class of algorithms doesn't use any a-priori knowledge but tries to analyze the parameters based on point-to-point correspondences from a number of images [6, 20, 3]. A good overview can be found in reference [11].

The outer orientation of a camera describes its position in the world related to a coordinates system. This coordinates system can be given by another camera, or by a calibration object, or uniquely defined by the user. In order to determine the outer orientation one or more views of a scene are necessitated. In [24] the outer orientation is obtained in reference to the pattern which is supposed to be placed in the coordinate origin. Otherwise the orientation of cameras in a camera array, or the trajectory of a moving camera can be found by evaluating the point correspondences in adjacent camera images. At least 7 correspondence points allow the calculation of a so called fundamental matrix, which describes the rotation and translation parameters [16, 9, 10].

The colorimetric calibration describes the light intensity and color deviations occurring in an optical system. A number of typical errors are summed up as chromatic aberration [17, 13]. Another typical error is vignetting [27, 23]. Due to different illumination conditions the reproduction of colors in an image can deviate significantly from the real colors perceived by the physical eye. This is due to the fact that the eye can automatically adapt to different light (different light temperature), but a camera can not. Different algorithms for color correction from free scenes can be found in [18, 14, 15, 1, 7, 22]. If a color checker is available for calibration the color correction can be done by calculating a 3×3 matrix which transforms the distorted colors to the corrected representation. In reference [12] an approach can be found for color and geometric calibration.

Most of the above mentioned concepts for calibrating a camera necessitate a relatively high computational effort. For example, some of the above mentioned approaches for camera calibration necessitate a complete rendering of a known calibration object using computer graphics. In addition, the complete rendering has to be repeated whenever one or more of the camera parameters is modified, i.e. possibly once per iteration of an optimization algorithm to determine a good estimation of the camera parameters. Other of the mentioned approaches for camera calibration necessitate an image feature analysis and/or a symmetry determination which typically are computationally intensive.

Another task that may have to be performed on an image (more general: data) acquired by a camera or another acquisition device (e.g., X-ray, computer tomography, magnetic resonance imaging, millimeter wave scanner, radar, sonar, etc.) is the detection and/or the tracking of an object. The camera parameters (or acquisition parameters) are known with sufficient precision. Furthermore, at least some object-related parameters are typically known. In order to detect or track an object, the position and/or the orientation of the object may be determined.

SUMMARY

According to an embodiment, an apparatus for determining model parameters may have: an object model transformer configured to receive an object model of a known object and to perform a transformation of the object model based on a set of model parameters from a first frame of reference to a second frame of reference, to determine as result of this transformation a transformed object model having at least one region, the at least one region being associated to an object region of the object; a region comparator configured to receive the transformed object model and an image depicting the object, to determine for a selected region of the transformed object model a region-related similarity measure representative of a similarity between the selected region and an image section of the image associated to the selected region via a transformation-dependent mapping, wherein the similarity measure has a geometric similarity component and an image value similarity component; and a model parameter determiner configured to determine an updated set of model parameters on the basis of the region-related similarity measure and an optimization scheme.

According to another embodiment, a method for determining model parameters using a known object may have the steps of: receiving an object model of the object; transforming the object model based on a set of model parameters from a first frame of reference to a second frame of reference, to determine as result of this transformation a transformed object model having at least one region, the at least one region being associated to at least one object region of the object; receiving an image depicting the object; determining for a selected region of the transformed object model a region-related similarity measure representative of a similarity between the selected region and an image section of the image associated to the selected region via a transformation-dependent mapping, wherein the similarity measure has a geometric similarity component and an image value similarity component; and determining an updated set of model parameters on the basis of the region-related similarity measure and an optimization scheme.

Another embodiment may have a computer program having a program code for performing, when running on a computer, the inventive method.

Embodiments of the present invention provide an apparatus for determining model parameters. The apparatus comprises an object model transformer, a region comparator, and a model parameter determiner. The object model transformer is configured to receive an object model of a known object and to perform a transformation of the object model based on a set of model parameters. The transformation transforms the object model from a first frame of reference to a second frame of reference. As result of this transformation the object transformer is configured to determine a transformed object model comprising at least one region, the at least one region being associated to an object region of the object. The region comparator is configured to receive the transformed object model and an image depicting the object. The region comparator is further configured to determine for a selected region of the transformed object model a region-related similarity measure. The region-related similarity measure is representative of a similarity between the selected region and an image section of the image. This image section is associated to the selected region via a transformation-dependent mapping. The model parameter determiner is configured to determine an updated set of model parameters on the basis of the region-related similarity measure and an optimization scheme.

Typically, but not necessarily, the model parameters are determined by the apparatus in the context of, or in relation to, an imaging technique for imaging an object. The imaging technique may be optical, sound-based (e.g., Sonar), radiation-based (e.g., X-ray, computer tomography, Radar, etc.), electromagnetic field-based (e.g., millimeter wave scanner), and the like. Furthermore, the imaging technique may be for acquiring the object in a n-dimensional manner (one-dimensional, two-dimensional, three-dimensional, . . . ) and produce an m-dimensional image, with m and n being equal or different.

Further embodiments of the present invention provide a method for determining model parameters using a known object. The method comprises receiving an object model of the object, transforming the object model, receiving an image, determining a region-related similarity measure, and determining an updated set of model parameters. The transforming of the object model is based on a set of model parameters. A corresponding transformation transforms the object model from a first frame of reference to a second frame of reference. As result of this transformation a transformed object model is determined, the transformed object comprising at least one region. The at least one region is associated to at least one object region of the object. The image that is received depicts the object. The region-related similarity measure is determined for a selected region of the transformed object and is representative of a similarity between the selected region and an image section of the image associated to the selected region via a transformation-dependent mapping. Determining the updated set of model parameters is done on the basis of the region-related similarity measure and an optimization scheme. Typically, but not necessarily, the model parameters are determined in the context of, or in relation to, an imaging technique for imaging an object.

Further embodiments of the present invention provide a computer program having a program code for performing, when running on a computer, the above mentioned method. Similarly, a computer readable digital storage medium may be provided by some embodiments having stored thereon a computer program having a program code for performing, when running on a computer, a method for determining model parameters using a known object, the method comprising: receiving an object model of the object; transforming the object model based on a set of model parameters, a corresponding transformation transforming the object model from a first frame of reference to a second frame of reference, to determine as result of this transformation a transformed object model comprising at least one region, the at least one region being associated to at least one object region of the object; receiving an image depicting the object; determining for a selected region of the transformed object model a region-related similarity measure representative of a similarity between the selected region and an image section of the image associated to the selected region via a transformation-dependent mapping; and determining an updated set of model parameters on the basis of the region-related similarity measure and an optimization scheme. Typically, but not necessarily, the model parameters are determined in the context of, or in relation to, an imaging technique for imaging an object.

In some embodiments of the present invention the transformation of the object model typically necessitates little computational effort. The same may be true for the regional-related similarity measure. Therefore, tasks that typically need to be performed once per iteration, e.g., for each new updated set of model parameters, may be performed relatively fast.

The mentioned transformation of the object model to the transformed object model may further comprise an image value transformation. The similarity measure may comprise a geometric similarity component and an image value similarity component. The geometric similarity component indicates how well the geometry of the image section matches the geometry of the selected region. The geometric similarity may consider any translational offset and/or rotational deviation between the image section and the selected region. In addition or in the alternative, the geometric similarity may take into account how well a shape (e.g. boundary, circumference, etc.) of the image section matches the shape of the selected region. The image value similarity component indicates how well image values (e.g., colors, shades of gray, absorption coefficients (in the case of X-ray or CT images), reflection coefficients (in the case of radar, sonar), etc) of the image section coincide with image values of the selected region, the image values of the selected region being related to the image values of the image section via the transformation-dependent mapping.

The object model may comprise a data structure (e.g., a vector, an XML list, etc.) describing the at least one region by means of geometric properties. The object model transformer may be configured to transform the geometric properties to transformed geometric properties of the transformed object model.

The region comparator may be configured to integrate characteristic values of the image over the selected region. Furthermore or alternatively the region comparator may be configured to evaluate at least one integral image of the image for determining the region-related similarity measure. The region comparator may also be configured to approximate boundaries of the selected region by a closed curve having curve segments that are parallel to coordinate axes of the image. It is also possible that the region comparator is configured to evaluate the image section using the discrete Green's theorem, wherein a boundary of the image section used for the discrete Green's theorem is based on a polygonal approximation of a boundary of the selected region. Another option for the region comparator is that it may be configured to determine at least one statistical moment of the image for the selected region and to determine the region-related similarity measure on the basis of the at least one statistical moment. The region comparator may be configured to determine a mean image value on the basis of a first statistical moment and a uniformity measure on the basis of a second statistical moment for a uniformity of occurring image values within the image section, wherein the mean image value may be compared with an expected image value associated with the selected region to obtain a corresponding comparison result. The uniformity measure may indicate how well the image section is aligned with the selected region, the similarity measure being determined on the basis of, at least, the comparison result and/or the uniformity measure. The foregoing options for the region comparator may be implemented individually or combined with each other.

The object model may describe a plurality of regions corresponding to a plurality of calibration regions of the object, wherein the region comparator may be configured to iterate the selected region over at least a subset of the plurality of regions of the object model and to determine a combined similarity measure on the basis of a plurality of region-related similarity measures.

The object may comprise a plurality of shade or color calibration regions, each shade or color calibration region containing a unique shade or color. The selected region may be one of the plurality of shade or color calibration regions.

The optimization scheme may perform at least one optimization step of one of the Levenberg-Marquardt algorithm, a particle filter, Downhill-Simplex, a genetic algorithm, or a combination of any of these.

The apparatus may be configured to repeat a calibration parameter determination performed by the object model transformer, the region comparator, and the calibration parameter determiner on the basis of the updated set of parameters as the current set of parameters.

The object may be one of a calibration chart, a calibration object, and a standardized object.

BRIEF DESCRIPTION OF THE DRAWINGS

Embodiments of the present invention will be detailed subsequently referring to the appended drawings, in which:

FIG. 9 schematically illustrates an inner and outer shape approximation of a polygon;

FIG. 13b shows an example for a two-dimensional picture representation and a corresponding integral image with the region to be approximated;

FIG. 15a shows how a triangle can be approximated using a method according to an embodiment with different precisions;

FIG. 15b shows examples for different closed curves approximating a border of a triangle;

FIG. 16 shows examples of manipulating the triangle from FIGS. 15a and 15b;

FIG. 18 shows an example for a fast and simple algorithm for finding all pixels enclosed by a shape in an image or bounding box;

FIG. 19 shows an example for a primitive 2D region based object model for a traffic sign comprising various regions with different (or equal) characteristics (e.g. intensities, variances);

DETAILED DESCRIPTION OF THE INVENTION

Figure 1:
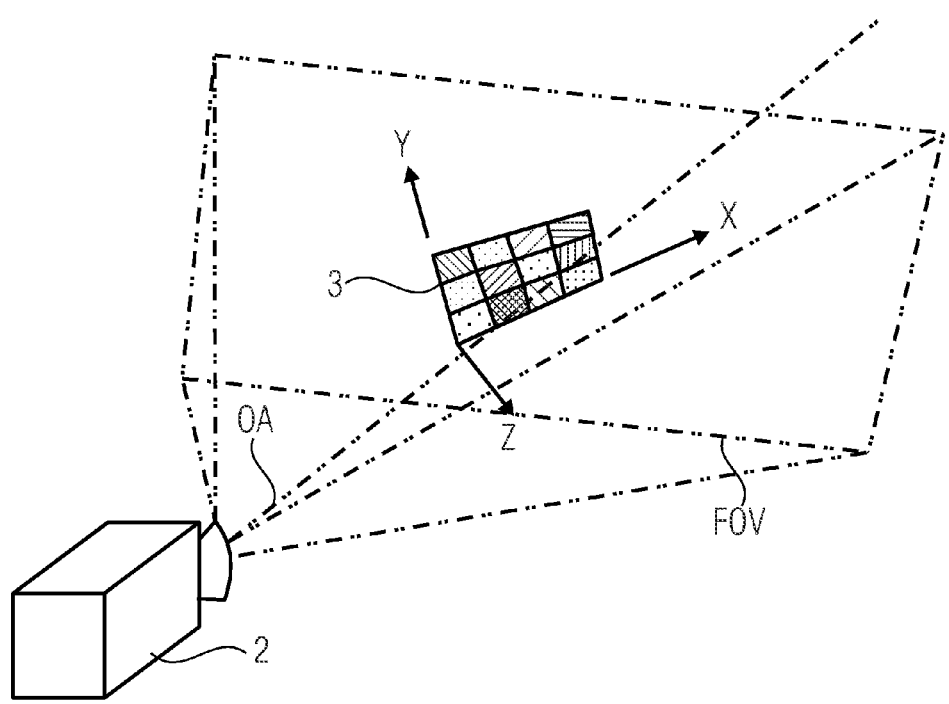
FIG. 1 schematically shows a setup for calibrating a camera using a calibration object such as a calibration chart.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Some embodiments relate to the detection and/or tracking of an object. Other embodiments relate to calibrating a camera or another acquisition device. Both task are somewhat related. The detection and/or tracking of an object typically aims at determining the position and/or the orientation of the object. Hence, the position and/or orientation is/are the unknown variable(s), whereas parameters that describe the object and the acquisition geometry (e.g. focal length, image resolution, image distortion, etc.) are a-priori known with sufficient precision. In the case of camera calibration, the acquisition geometry-related parameter(s) form(s) the unknown variable(s), whereas the object and its position and orientation are known. As a third possibility, the object may not be completely known, for example with respect to its size. It is also possible that the object may be deformable (e.g., a foldable calibration chart) so that one or more deformation parameters of the object are variable and need to be determined. In the following description, an emphasis is placed on the camera calibration, for explanatory reasons. However, the concepts described below are readily applicable to other use cases or applications of methods and apparatus according to embodiments described herein, in particular object tracking and/or detection.

FIG. 1 schematically illustrates a setup for a camera 2 calibration using a known object such as a calibration chart 3. An optical axis OA and a field of view FOV can be defined for the camera 2. The calibration chart 3 is within the field of view FOV of the camera 2 in FIG. 1. A position and orientation of the calibration chart 3 can be defined relative to frame of reference. In the configuration shown in FIG. 1, the frame of reference is defined by a coordinate system, the origin of which coincides with one of the corners of the calibration chart 3. Furthermore, the two of the three coordinate axes are parallel to respective edges of the calibration chart 3. Of course, it is also possible to choose another frame of reference (e.g., a related frame of reference that is defined by a fixed point of a room, a recording studio, a landscape etc) and to (manually or otherwise) determine the position and orientation of the calibration chart within this frame of reference. The task of the camera calibration may be to determine the position and orientation of the camera within the frame of reference of the calibration chart.

The calibration chart 3 shown in FIG. 1 is representative of any object that may be acquired using the camera. The object comprises one or more regions, e.g. the color fields of the calibration chart 3. In case the object comprises two or more regions the regions may be adjacent to each other or they may be at a distance from each other. The camera 2 may be regarded as being representative of any acquisition device, such as digital still cameras, video cameras, camcorder, medical imaging equipment, Radar, Sonar etc. that may be used to acquire image data of a real object. The image itself may be one-dimensional, two-dimensional, three-dimensional, or higher dimensional.

Figure 2A:
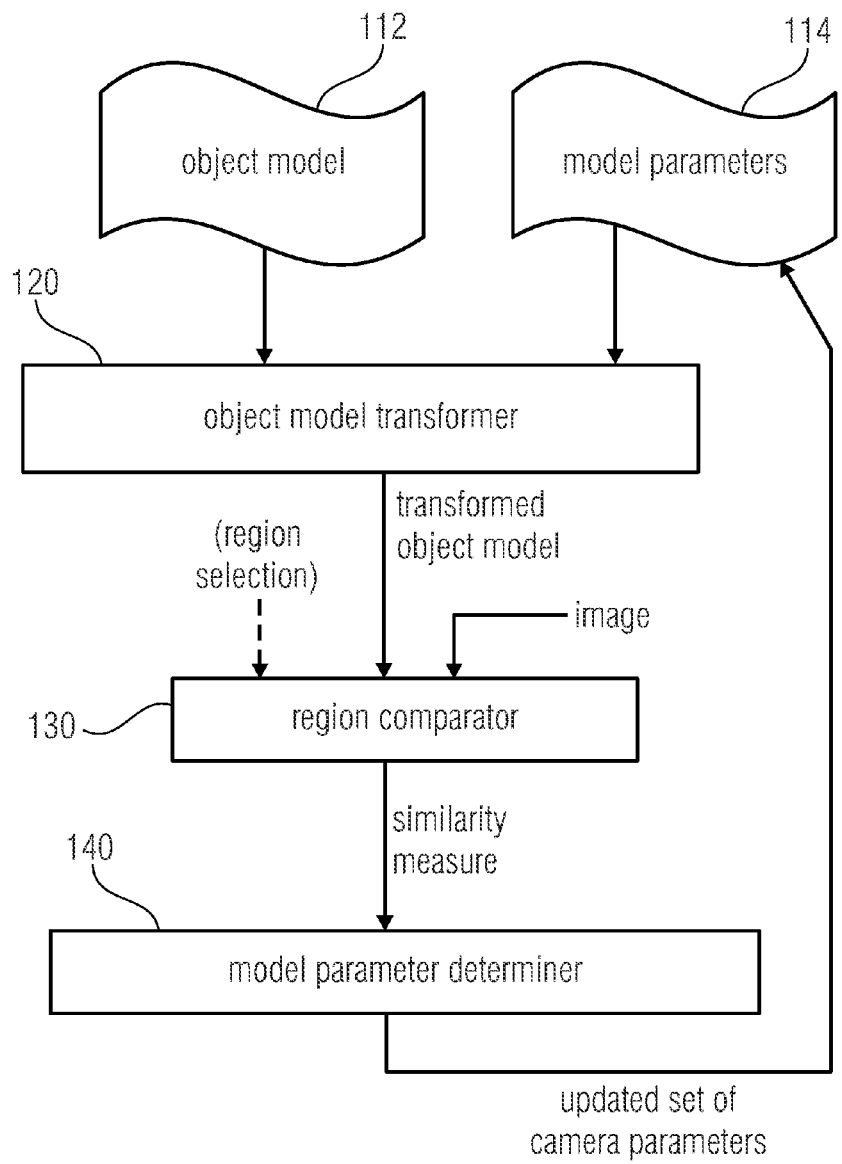
FIG. 2A shows a schematic block diagram of an apparatus for determining model parameters according to some embodiments.

FIG. 2A shows a schematic block diagram of an apparatus for determining model parameters according to at least some embodiments. The apparatus comprises an object model transformer 120, a region comparator 130, and a model parameter determiner 140. The object model transformer 120 is configured to receive an object model 112 that describes an object by means of, for example, its size, dimensions, shape, colors etc. In particular, a few characteristic locations of the object may be described, as well as their geometric relations to each other or to one object-related point of reference. The object is typically known with respect to its shape and dimensions. The object model transformer 120 is configured to receive a set of model parameters 114 that describes a current estimation of model parameters, such as position and orientation. Based on these two inputs the object model transformer may then determine how the model would be imaged under the assumption of the model parameters. The transformation results in a transformed object model. Some aspects of the transformation of the object model 112 to the transformed object model will be described below in connection with the description of FIG. 3.

The transformed object model is forwarded to the region comparator 130. The region comparator 130 is further configured to receive an image that has been acquired using the acquisition device at hand, e.g. a camera. Using the image it can be determined how well the set of model parameters 114 matches an actual set of model parameters (which is, however, unknown at this point). Another optional input for the region comparator 130 is a region selection that determines for which region of a plurality of regions of the transformed object model a similarity measure between the transformed object model and the camera image is to be determined. The region or regions of the transformed object model correspond to regions of the real object which exhibit a specific characteristic. For example, a region of the object may be a shape (square, rectangle, circle, polygon, etc) with a single color.

As a result of the transformation, a given region of the object is projected onto a particular image section of the image. The transformation allows the determination of the geometry of, and/or the image values within, the image section. An example shall illustrate this: Consider a region of the real object and assume that the region is a green square. The object model may now define the locations of the four vertices of the square relative to an object-inherent point of reference, for example one corner of the object. Furthermore, the object model may define the shade of green by means of some predetermined color classification scheme. By means of the transformation, the locations of the four vertices of the green square are projected onto a camera-related frame of reference, for example the 2D coordinates of an image sensor expressed in pixels. Note that this transformation or projection may not necessarily result in a square anymore, but usually in a rectangle, a parallelogram, a trapezoid, or a general quadrangle. Furthermore, the edges of the transformed square may not be rectilinear anymore, but curved, due to some image distortion. Such image distortions can typically not be represented by the vertices but may be accounted for in the model parameters in addition to the locations of the vertices of the region contour.

The similarity measure determined by the region comparator 130 is provided to an model parameter determiner 140 which is configured to update the (current) set of model parameters and to provide an updated set of model parameters. The updated set of model parameters may replace the (current) set of model parameters and be used during a subsequent iteration of an optimization scheme. The similarity measure provided to the model parameter determiner 140 may be a scalar or a multi-dimensional data structure that contains some indication about a class of dissimilarity (geometry, distortion, color, etc) between the region of the transformed object model and the associated image section in the camera image. On the basis of this information the calibration parameter determiner 140 may determine the updated set of model parameters in a (more) target-oriented manner. For example, if the similarity measure indicates that the geometry of the region matches the geometry of the image section relatively well, but that there is still a discrepancy in the color, the model parameter determiner 140 may keep the current geometry-related parameters while modifying one or more of the color-related parameters for the next iteration. The similarity measure may comprise a geometric similarity component (or: geometry-related similarity component) and/or an image value similarity component (or: image value-related similarity component).

Moreover, the calibration parameter determiner 140 may infer the updated set of model parameters by evaluating the previously determined sets of model parameters (obtained during previous iterations), for example by means of an optimization strategy or scheme. The previously determined sets of model parameters may be stored in a parameter storage. In this manner, a behavior of the similarity measure as a function of the model parameters may be estimated, which may be used to make better guesses for the next updated set of model parameters.

Figure 2B:
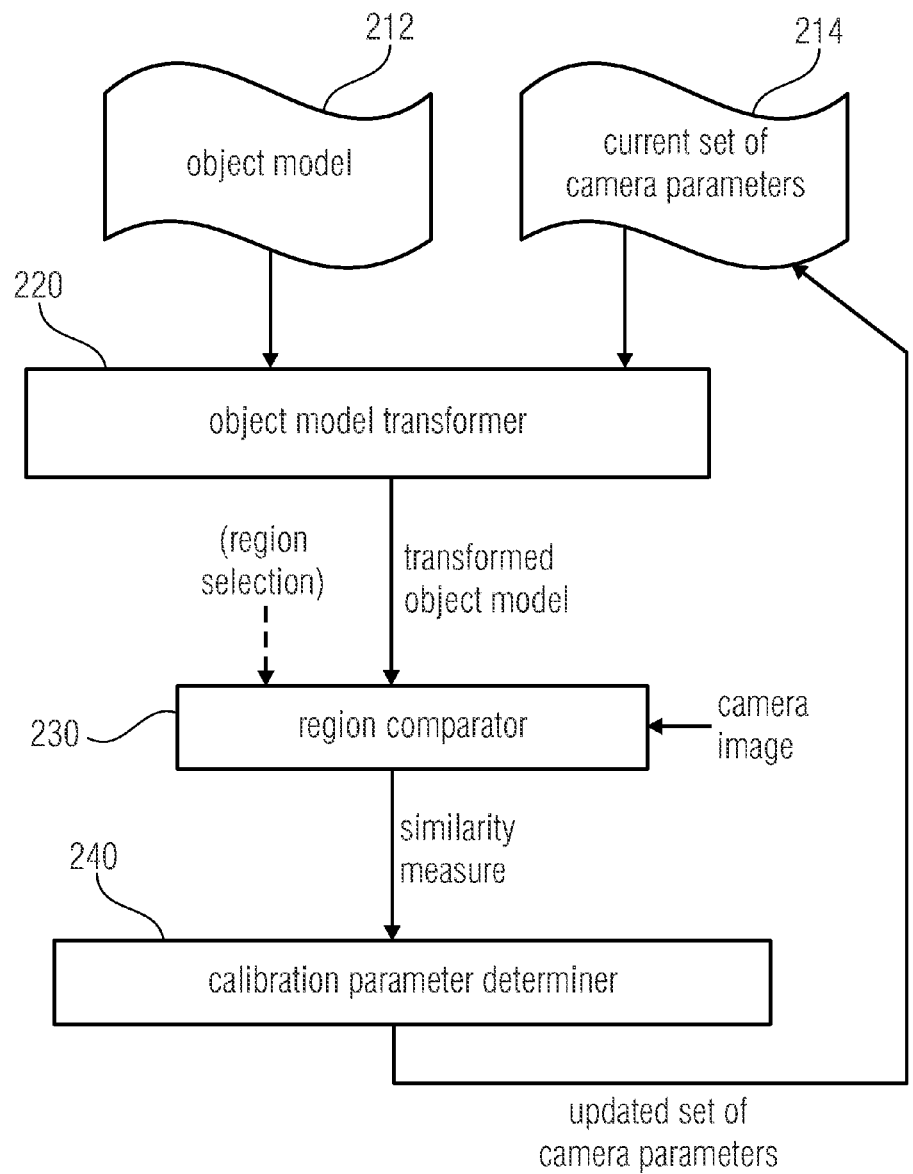
FIG. 2B shows a schematic block diagram of an apparatus for determining calibration parameters for a camera according to some embodiments.

FIG. 2B shows a schematic block diagram of an apparatus for determining camera calibration parameters according to at least some embodiments. The apparatus comprises an object model transformer 220, a region comparator 230, and a calibration parameter determiner 240. The object model transformer 220 is configured to receive an object model 212 that describes an object by means of, for example, its size, dimensions, shape, colors etc. In particular, a few characteristic locations of the object may be described, as well as their geometric relations to each other or to one object-related point of reference. The object is typically known and may be, for example, a calibration chart. Furthermore, the object model transformer 220 is configured to receive a set of camera parameters 214 that describes a current estimation of a camera-related parameters, such as position and orientation in the frame of reference that is valid for the object, and imaging properties of the camera (focal length, pixel size, distortion, color mapping, etc.). Based on these two inputs the object model transformer may then determine how the model would be imaged by a camera for which the set of camera parameters is valid. The transformation results in a transformed object model. Some aspects of the transformation of the object model 212 to the transformed object model will be described below in connection with the description of FIG. 3.

The transformed object model is forwarded to the region comparator 230. The region comparator 230 is further configured to receive a camera image that has been acquired using the camera to be calibrated. Using the camera image it can be determined how well the set of parameters 214 matches an actual set of camera parameters. Another optional input for the region comparator 230 is a region selection that determines for which region of a plurality of regions of the transformed object model a similarity measure between the transformed object model and the camera image is to be determined. The region or regions of the transformed object model correspond to regions of the real object which exhibit a specific characteristic. For example, a region of the object may be a shape (square, rectangle, circle, polygon, etc) with a single color.

As a result of the transformation, a given region of the object is projected onto a particular image section of the camera image. The transformation allows the determination of the geometry of, and/or the image values within, the image section. An example shall illustrate this: Consider a region of the real object and assume that the region is a green square. The object model may now define the locations of the four vertices of the square relative to an object-inherent point of reference, for example one corner of the object. Furthermore, the object model may define the shade of green by means of some predetermined color classification scheme. By means of the transformation, the locations of the four vertices of the green square are projected onto a camera-related frame of reference, for example the 2D coordinates of an image sensor expressed in pixels. Note that this transformation or projection may not necessarily result in a square anymore, but usually in a rectangle, a parallelogram, a trapezoid, or a general quadrangle. Furthermore, the edges of the transformed square may not be rectilinear anymore, but curved, due to some image distortion.

The similarity measure determined by the region comparator 230 is provided to a calibration parameter determiner 240 which is configured to update the (current) set of camera parameters and to provide an updated set of camera parameters. The updated set of camera parameters may replace the (current) set of camera parameters and be used during a subsequent iteration of an optimization scheme. The similarity measure provided to the calibration parameter determiner 240 may be a scalar or a multi-dimensional data structure that contains some indication about a class of dissimilarity (geometry, distortion, color, etc) between the region of the transformed object model and the associated image section in the camera image. On the basis of this information the calibration parameter determiner 240 may determine the updated set of camera parameters in a (more) target-oriented manner. For example, if the similarity measure indicates that the geometry of the region matches the geometry of the image section relatively well, but that there is still a discrepancy in the color, the calibration parameter determiner 240 may keep the current geometry-related parameters while modifying one or more of the color-related parameters for the next iteration. The similarity measure may comprise a geometric similarity component (or: geometry-related similarity component) and/or an image value similarity component (or: image value-related similarity component).

Moreover, the calibration parameter determiner 240 may infer the updated set of camera parameters by evaluating the previously determined sets of camera parameters (obtained during previous iterations), for example by means of an optimization strategy or scheme. The previously determined sets of camera parameters may be stored in a parameter storage. In this manner, a behavior of the similarity measure as a function of the camera parameters may be estimated, which may be used to make better guesses for the next updated set of camera parameters.

Figure 3:
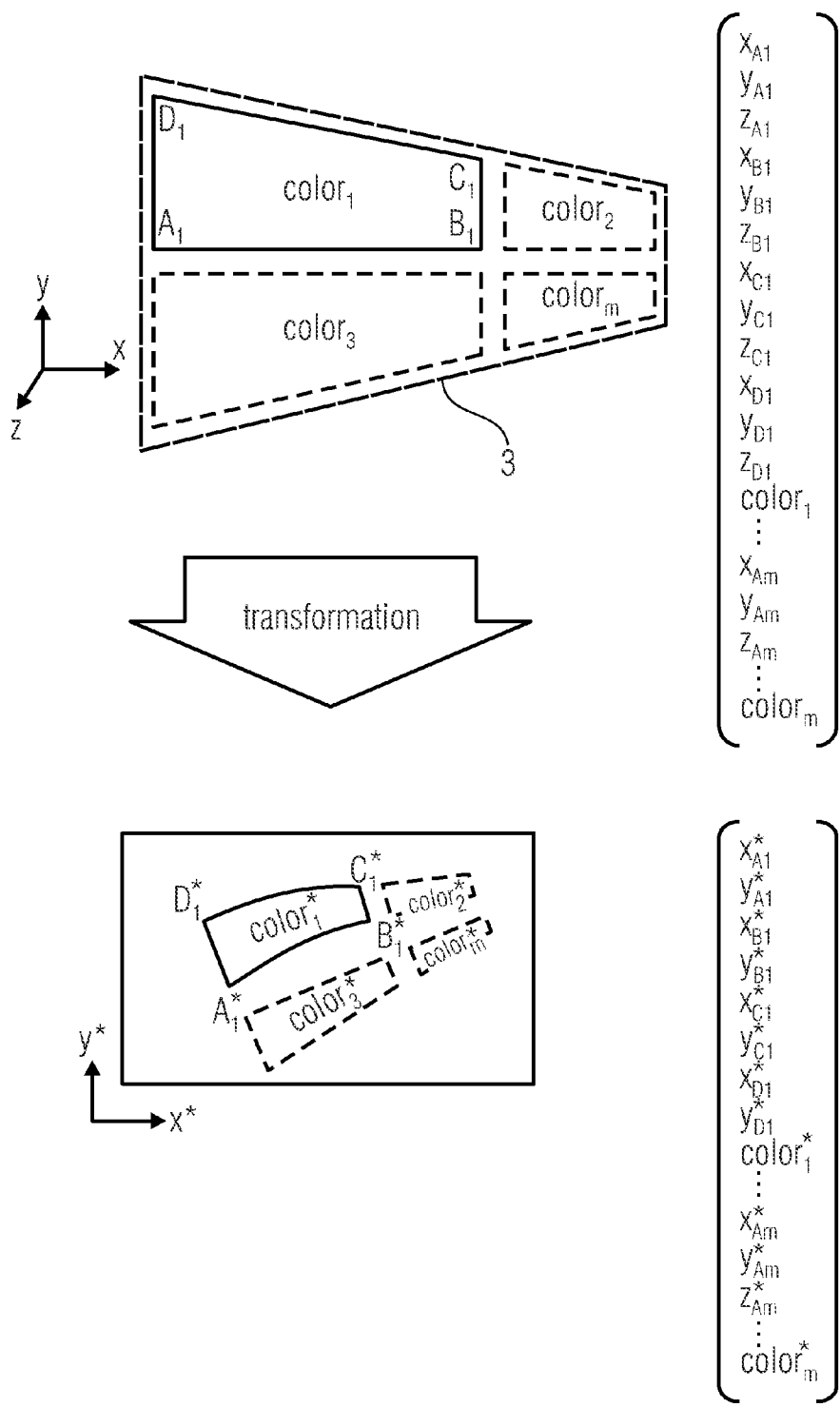
FIG. 3 schematically illustrates a transformation of an object model.

FIG. 3 schematically illustrates the transformation of the object model defined in a first frame of reference to the transformed object model defined in a second frame of reference. The object 3 is schematically illustrated as a calibration chart comprising m different regions. The first frame of reference is indicated by a 3D coordinate system x, y, z. Note that the object 3 is illustrated in a perspective view in order to illustrate that the object 3 itself may be rotated and/or translated with respect to the first frame of reference. The m different regions have the colors $color_1$, $color_2$, $color_3$, $color_m$, respectively. A geometry of the first region is defined by the 3D locations of the four corners $A_1$, $B_1$, $C_1$, $D_1$, of the $color_1$ rectangle expressed using the coordinates x, y, z of the first frame of reference, in this case as $(x_{A1}, y_{A1}, z_{A1})$, $(x_{B1}, y_{B1}, z_{B1})$, $(x_{C1}, y_{C1}, z_{C1})$, $(x_{D1}, y_{D1}, z_{D1})$. Furthermore, the color is defined as color1. In the same manner the geometries of the remaining regions are defined so that a vector $(x_{A1}, y_{A1}, z_{A1}, x_{B1}, y_{B1}, z_{B1}, x_{C1}, y_{C1}, z_{C1}, x_{D1}, y_{D1}, z_{D1},$
$color_1, \ldots x_{Am}, y_{Am}, z_{Am} \ldots color_m)^T$ describing the object is obtained, as illustrated in the upper right portion of FIG. 3.

The transformation determines the transformed object model relative to a second frame of reference defined by a 2D coordinate system x*, y*. The corners of the first region are transformed (or geometrically projected) to locations $A^*_1$, $B^*_1$, $C^*_1$, $D^*_1$. The color color1 is (color-) transformed to a new color $color^*_1$. The transformed object model can be expressed by means of a vector $(x^*_{A1}, y^*_{A1}, x^*_{B1}, y^*_{B1}, x^*_{C1}, y^*_{C1}, x^*_{D1}, y^*_{D1},$
$color^*_1, \ldots x^*_{Am}, y^*_{Am}, \ldots color^*_m)^T$, as illustrated in the lower right portion of FIG. 3.

Figure 4:
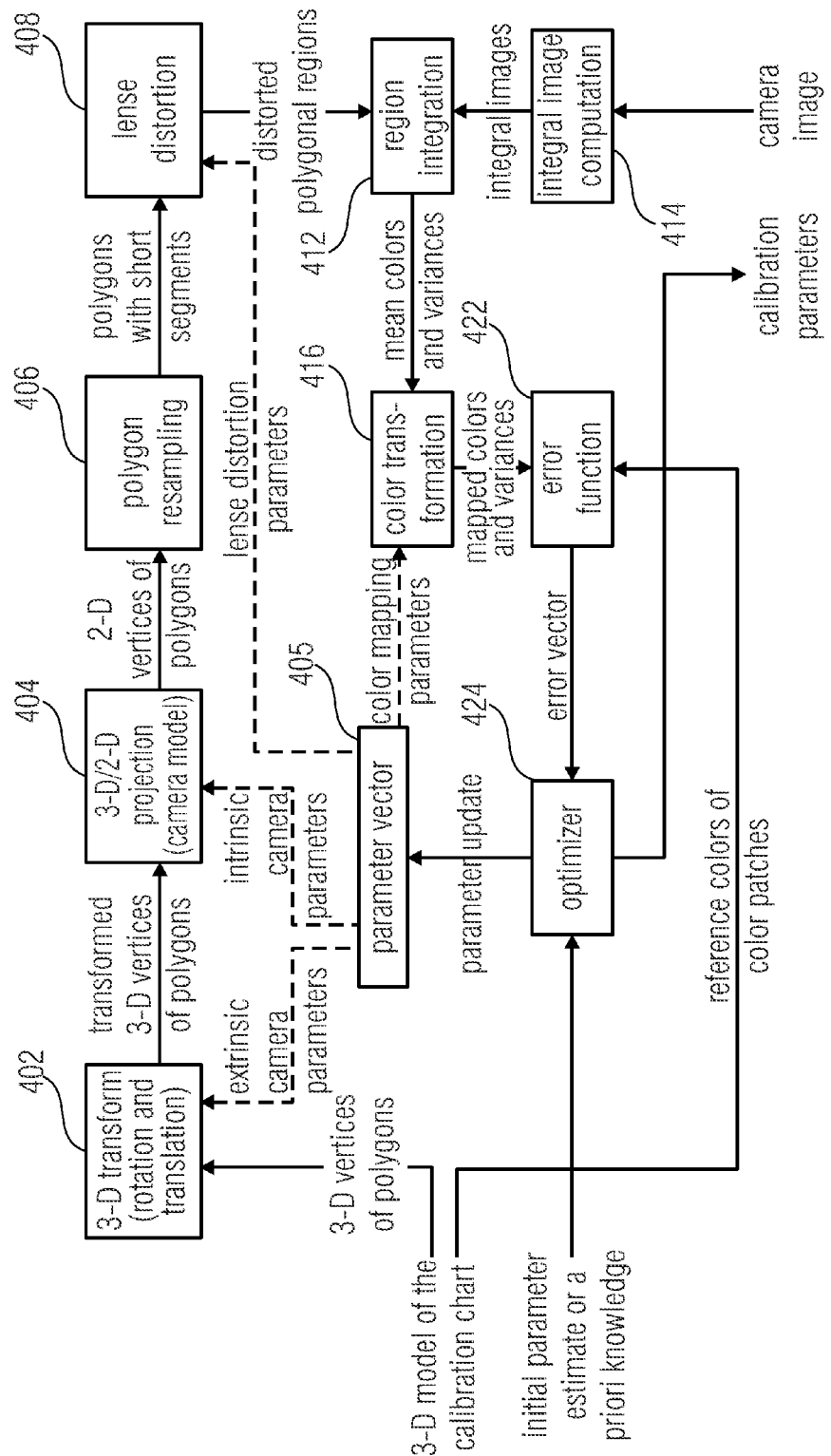
FIG. 4 shows, as a schematic block diagram, a system overview of a calibration framework according to the teachings disclosed herein.

In FIG. 4 which will be described next, an embodiment of the apparatus for determining camera calibration parameters is presented in block diagram form.

In order to calibrate a camera, basically the real world could be simulated with a parameterizable model of the calibration chart and the camera, an artificial camera view could then be generated (rendered) based on a parameter set, and the artificial camera image of the simulation could be compared with the image of the real camera. Assuming that the real world system is very well simulated with the model and the parameter set, it can be expected that the calibration chart in the simulated camera image appears almost equal to the calibration chart in the real camera image. Therefore the parameter set is optimized in a way that the calibration chart in the simulated image fits the appearance in the real image as good as possible. In the end, the optimization process results in a parameter set that reflects the real camera calibration parameters.

The optimizer typically necessitates an objective function that shows the accordance between the simulated and real camera image. The obvious approach to realize this objective function is to use the difference of the image pixels that belong to the calibration chart in the simulated and real camera image respectively. This brute force approach has strong drawbacks. It results in a computationally very intensive system, because each evaluation of a parameter set with the objective function necessitates that the artificial camera image is generated (rendered) and the difference between the real and artificial image of the pixels that belong to the calibration chart is calculated. Moreover within the optimization procedure the objective function usually has to be evaluated very often.

Based on this idea a calibration framework is described in the following paragraphs that minimizes the computational costs and offers great flexibility and robustness. FIG. 4 shows an overview of the most important elements of the calibration framework. We will now describe in detail all the elements of this figure.

The inputs of the calibration framework are the real camera image (or images) that shows the calibration chart (bottom right) and the 3-D model of the calibration chart that is shown in the real camera image (middle left). Moreover a-priori knowledge or an initial guess for a parameter vector 405 (containing camera calibration parameters) is necessitated. It could for example be obtained based on assumptions about the size, position and orientation of the calibration chart in the image (or relative to the camera). If the calibration framework is applied on an image sequence (e.g. tracking of the calibration chart) then the result of the previous image could be used as an initial estimate. In the worst case a brute force search in the parameter space is necessitated.

The system is parameterized with the parameter vector 405 that consists of the extrinsic camera parameters (rotation and translation components $r_x$; $r_y$; $r_z$; $t_x$; $t_y$; $t_z$ for the three coordinate axes), intrinsic camera parameters and lens distortion parameters (focal length, pixel size, principal point and lens distortion coefficients f; $s_x$; $s_y$; $c_x$; $c_y$; $k_1$; $k_2$). Moreover the parameter vector 405 includes the color correction parameters, e.g. the elements of a linear 3×3 color transformation matrix $M_{3\times3}$. We start with the description of the 3-D calibration chart model on the left. Each color patch (or region with homogeneous color) of the calibration chart is modeled only by the region boundary and the reference color of the patch. The region boundary can be approximated with arbitrary precision by a polygon defined by vertices in 3-D space. If we use a flat calibration chart and put the 3-D world coordinate system in the chart, then all the polygons could be defined in the x-y plane with z of all vertices being 0. For rectangular regions it would even be enough to define the four corners of the rectangle. The whole calibration chart is modeled by all the color patches (and homogeneous regions) that are incorporated in the calibration procedure. The world coordinate system can be fixed relative to the calibration chart for convenience.

The 3-D polygon vertices of the calibration chart are subject to 3-D rotation and translation defined by the extrinsic parameters (this can also be considered as the inverse camera transformation), using the block "3-D transform (rotation and translation)" 402.

Thereafter the transformed 3-D vertices are projected into the 2-D image plane with a camera model 404 that is parameterized by internal camera parameters (using for example a projective or pinhole camera model). This results in 2-D image coordinates for the polygon vertices. The 2-D vertices are then forwarded to a polygon resampling block 406.

The subsequent polygon resampling divides all polygonal lines which are longer than a predefined threshold into sections by inserting additional vertices in the involved polygon segments. Therefore the polygon regions can be approximated with an arbitrary number of vertices by choosing a small value for the maximum polygon segment length. The resampling step not necessarily has to be done here but can be applied in principle in an arbitrary place previous to a downstream region integration block 412 and the first block that does not map straight lines to straight lines (this is the case in the subsequent lens distortion block). In practice this resampling step 406 could already be applied once to the polygons of the 3-D calibration chart model as well.

The lens distortion 408 is applied to the resampled polygon vertices to model the physical properties of the camera lens and usually results in curved lines of the color patch boundaries in the image. Without the resampling step this lens distortion could not be modeled adequately. Using for example only the four corners of a color patch the distortion of the rectangle boundaries is not possible. Moreover the resampling step 406 is necessitated for or simplifies at least the region integration in the following block 412.

The distorted polygon vertices of the color patches are forwarded to the region integration step 412. On the bottom right the camera image that shows the calibration chart is put into the calibration procedure. For each color band of the input image the integral image is computed by a block "integral image computation" 414 (this is described below in the context of the description of a determination of a measurement of a region of a two-dimensional picture representation). Moreover the integral images for the squared values of all image pixel values are calculated (these are necessitated for variance calculation in the color patches; this is also described below). All these integral image planes are fed into the region integration block 412. It represents one of the key ideas and elements of the calibration framework.

The region integration block 412 calculates for each polygon of the calibration chart model with the aid of the integral images (this could be done using a shape approximation as described below in another part of this disclosure)
 the sum of all pixel values enclosed by the polygon in the real camera image,
 the sum of all squared pixel values enclosed by the polygon in the real camera image, and
 the size of the area enclosed by the polygon in the real camera image.

An effective and simple approach to calculate this sum of pixel values within a polygon region will be described below in connection with FIG. 9.

Using the intermediate results (sum of pixel values within polygons for each color band and area of polygon regions) the mean values and variances of all color bands in the real camera image for each color patch region are calculated and fed into a color transformation block 416.

The color transformation 416 maps all mean color values (and variances) with the color mapping (or color correction) parameters, aiming at undistorted colors. The color transformation 416 can be a linear transform or any other applicable color correction. The output of this step/block is forwarded to an error function block 422.

The error function 422 compares the mapped mean colors measured in the camera image within the polygon regions with the reference colors of the color patches defined by the calibration chart. Moreover, it takes the color variances within the polygon regions into account and generates an error vector based on both, the color differences and variances. For example, the error vector could comprise the color variances and the differences between the measured mean colors and the reference colors in an appropriate color space (e.g. CIE Lab color space with visual equidistance or the RGB color space). The error vector is subject to optimization by an optimizer 424.

The optimizer 424 iteratively updates the parameter vector 405 in a way that the error vector is minimized. For this purpose various optimization schemes could by applied. For example the Levenberg-Marquardt algorithm, a particle filter (that could also incorporate further state parameters to the parameter vector 405 if the framework is applied to an image sequence), Downhill-Simplex or genetic algorithms for example.

After the optimization process the parameter vector 405 should reflect the calibration parameters very well. The color variances in all polygon regions as well as the differences between the mean color values in the polygon regions and the corresponding reference colors should approach zero (in the ideal case and neglecting sensor noise) if all the polygons perfectly fit the color patches in the camera image.

Figure 5:
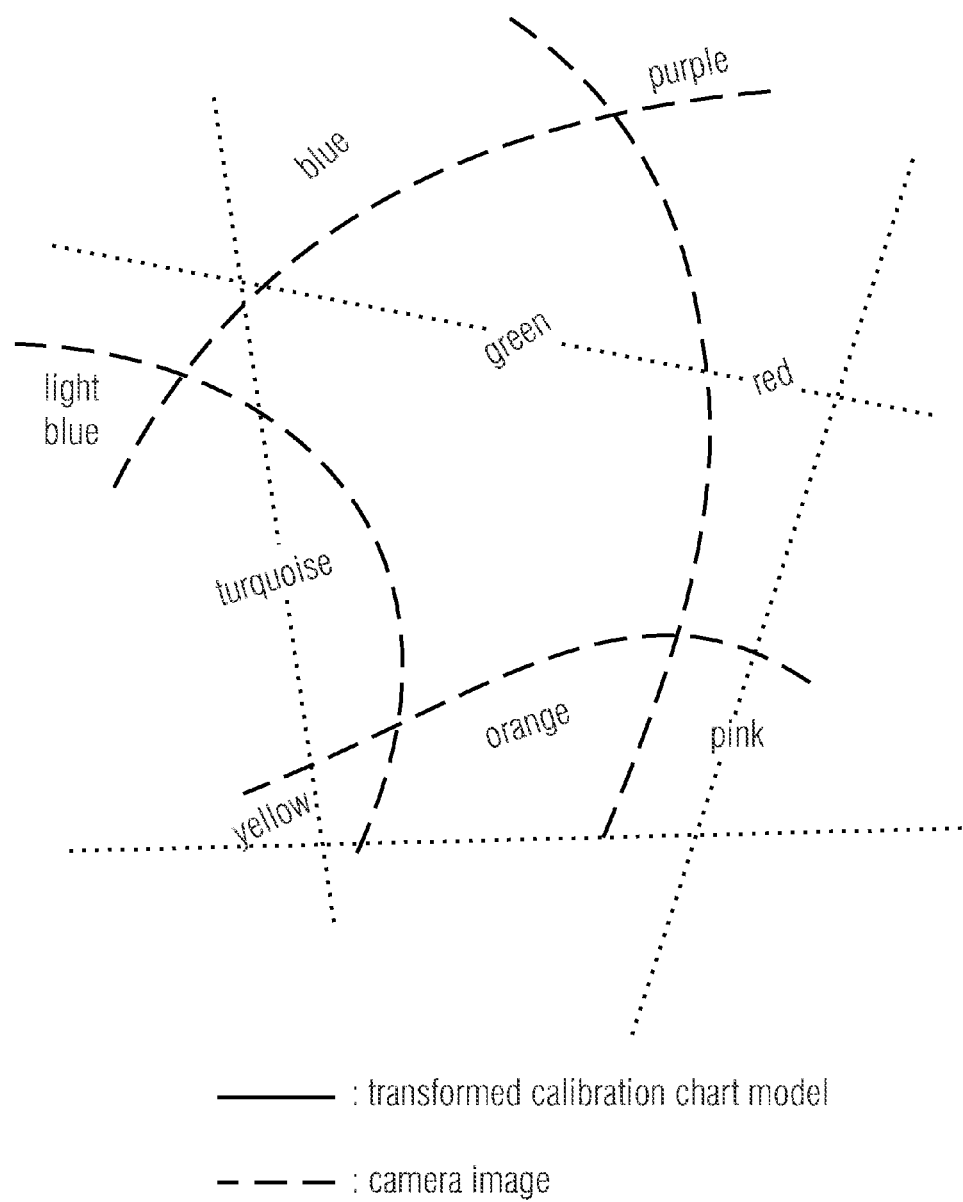
FIG. 5 schematically illustrates a portion of a camera image and, for reference, a portion of a transformed calibration chart model, the portion depicting several regions of different color.

FIG. 5 illustrates a portion of the camera image and a portion of the transformed object model, i.e., the transformed calibration chart model which serves as an example. The camera image shows the object or at least a part thereof. The object contains a plurality of regions of different color or pattern. Each region is assumed to be a square. In general, the regions may have arbitrary forms.

The illustrated portion of the camera image depicts several colored region, namely a central green region and eight surrounding regions with the following colors: light blue, blue, purple, turquoise, red, yellow, orange, and pink. Due to the perspective under which the camera to be calibrated acquires the object, and due to camera-inherent distortions, the square regions of the original object appear as distorted polygons (exaggerated for the purpose of illustration in FIG. 5), as indicated by the dashed lines in FIG. 5.

For the sake of reference, FIG. 5 also illustrates the region boundaries of the transformed regions as dotted lines. The transformed regions belong to the transformed object model. The boundaries of the transformed regions are rectilinear in the example shown in FIG. 5 which means that the set of camera parameters does not model a camera distortion. Nevertheless, it may be that also the region boundaries of the transformed regions are curved, i.e., the set of camera parameters assumes that the camera introduces a distortion.

By comparing the transformed calibration chart model (dotted line) with the imaged region in the camera image (dashed line) it can be seen that, for example, the imaged green region of the camera image does not match very well the corresponding green region of the transformed calibration chart model. Rather, the imaged green region of the camera image also extends into the blue and turquoise regions of the transformed calibration chart model. This mismatch between the camera image and the transformed calibration chart model indicates that the set of camera parameters that has been used to generate the transformed calibration chart model does not reproduce the geometry-related actual camera parameters very well. In addition, the color-related camera parameters of the set of camera parameters could be different from the actual color behavior of the camera, as well, which would result in an erroneous reproduction of the color acquisition of the camera by the set of camera parameters.

The goal of the camera calibration parameter determination is to update the set of camera parameters until the transformed region boundaries (dotted lines) substantially match the imaged boundaries of the image section (dashed lines), and until the color within each transformed region is substantially identical to the color of the corresponding imaged color region of the camera image. When this state is reached the corresponding set of camera parameters can be assumed to reproduce the behavior of the camera to be calibrated with relatively high accuracy.

Figure 6:
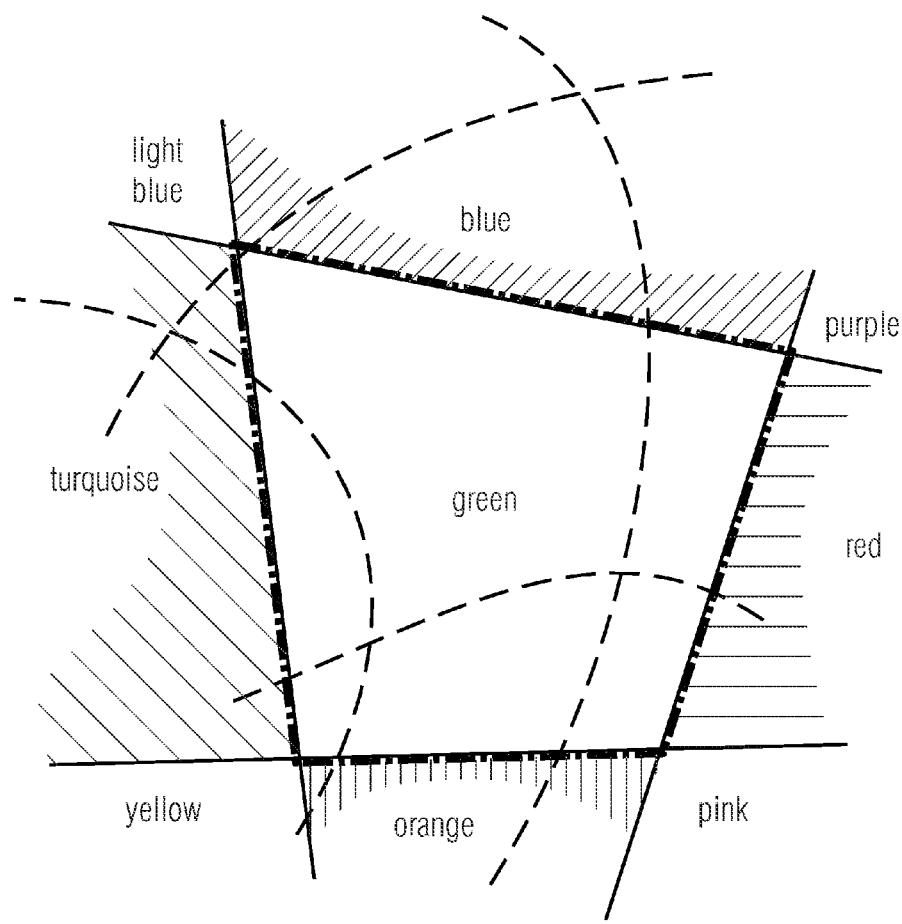
FIG. 6 schematically illustrates the portion of the transformed calibration chart model and the portion of the camera image from FIG. 5, in order to emphasis a selected region of the transformed calibration chart model.

FIG. 6 is similar to FIG. 5, however with an emphasis on the transformed object model instead of the camera image. Thus, the region illustrated in the middle of FIG. 6 is delimited by the solid lines and corresponds to a transformed green region of the calibration chart, i.e., of the real object. This region corresponds to a selected region which is indicated in FIG. 6 by the thick dash-dotted line. An image section of the camera image coincides with the selected region. It can be seen that the image section (and hence the selected region) is not aligned with the boundaries of the imaged regions of the camera image. Rather, the image section overlap six differently colored imaged regions of the camera image, namely the turquoise region, the green region, the red region, the yellow region, the orange region, and the pink region that can be seen in the camera image. When evaluating the colors in the image section that corresponds to the selected region it can be seen that the color green is predominant, followed by orange, red, turquoise, pink, and finally yellow. The transformed calibration chart model is offset to the bottom and rotated about 20 degrees in the clockwise direction with respect to the camera image. Thus, in the situation depicted in FIG. 6, the set of camera parameters should be modified so that the transformed object is shifted up and rotated in the counterclockwise direction in order to better match the camera image (dashed lines). Furthermore, the set of camera parameters would need to reproduce the distortion of the camera in order to approximate the curved region boundaries that can be observed in the camera image. In addition it may be necessitated to adapt the color-related camera parameters so that the shade of green of the selected region of the transformed model is substantially the same as the shade of green that appears in the camera image.

Figure 7:
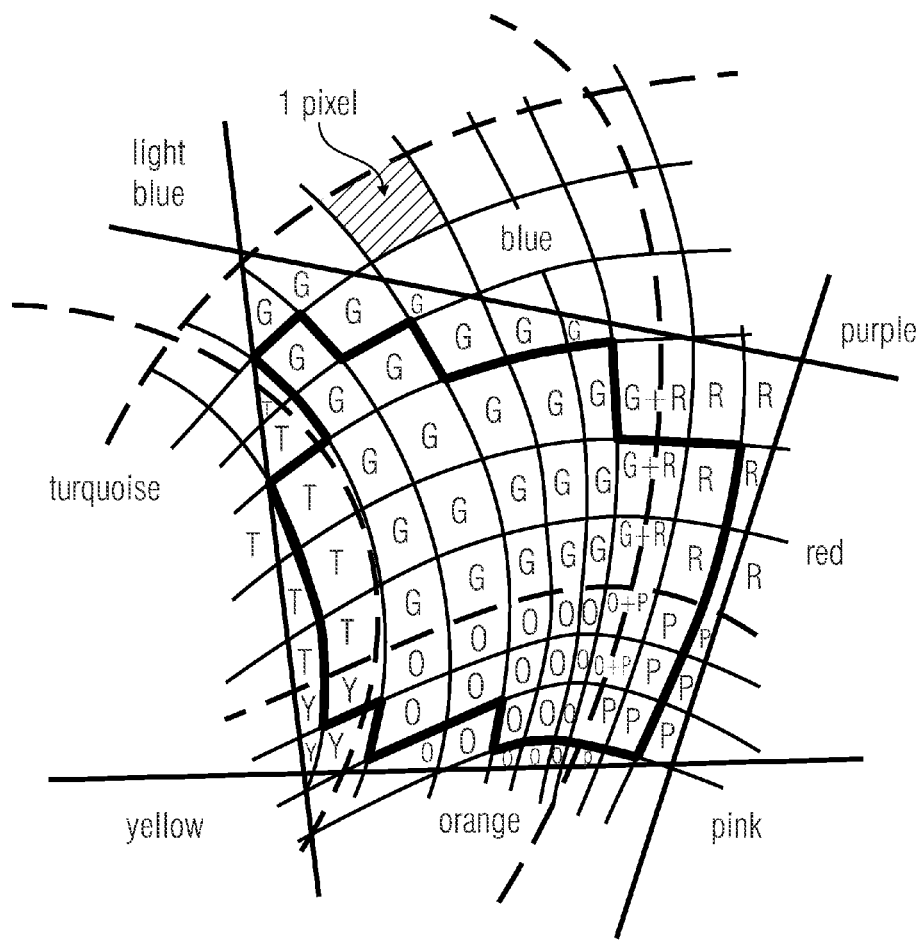
FIG. 7 schematically illustrates the portions of the transformed calibration chart model and of the camera image of FIG. 6 with a boundary of the selected region being approximated by an inscribed shape.

FIG. 7 illustrates an approximation of the boundary of the selected region by means of segments that are parallel to a first axis or a second axis of the camera image. The approximation reproduced the boundary of the selected region by means of an inscribed shape, i.e. the approximating shape is completely within the selected region. Note that the axes of the camera image may not appear rectilinear and/or orthogonal to each other in another frame of reference, e.g., an object-related frame of reference or a "real-world" frame of reference. For this reason, the segments of the approximating shape may appear curved. In FIG. 7 a pixel resolution of the camera image is illustrated. The segments of the approximating shape follow the boundaries between two pixels. As mentioned above with respect to FIG. 6, differently colored regions of the camera image may fall into the selected region. Each pixel enclosed by the approximating shape may detect a different color or a mixture of two different colors, in accordance with the corresponding portion of the camera image. The colors detected by the various pixels within the selected region are indicated in FIG. 7 by the following letters: "G" for green, "R" for red, "T" for turquoise, "Y" for yellow, "O" for orange, and "P" for pink (refer to FIG. 5 and the dashed lines in FIG. 5 that indicate the boundaries between the different colors in the acquired camera image—the dashed lines are also reproduced in FIG. 7). Most of the pixels acquire a single color. However, some pixels are on a boundary between two imaged regions so that they acquire two (or more) different colors. For example, the boundary between the green imaged region and the red imaged region goes right through the middle of several pixels. Hence, these pixels acquire both green and red, which is indicated in FIG. 7 by the abbreviation "G+R". Similarly, the abbreviation "O+P" means orange and pink.

Counting the pixels that are enclosed by the approximating shape yields the following result:
  green: 18 pixels
  orange: 13 pixels
  pink: 4 pixels
  turquoise: 3 pixels
  red: 2 pixels
  green and red: 2 pixels
  orange and pink: 2 pixels
  yellow: 1 pixel
  total: 45 pixels An evaluation of these results reveals that the predominant color in the selected region is green. However, the colors show a noticeable spread, i.e., a variance of the colors is relatively high. This could mean that the geometry of the selected region does not reproduce the geometry of the imaged region very well.

An alternative option for evaluating the selected region will be described below and is based on integral images.

Figure 8:
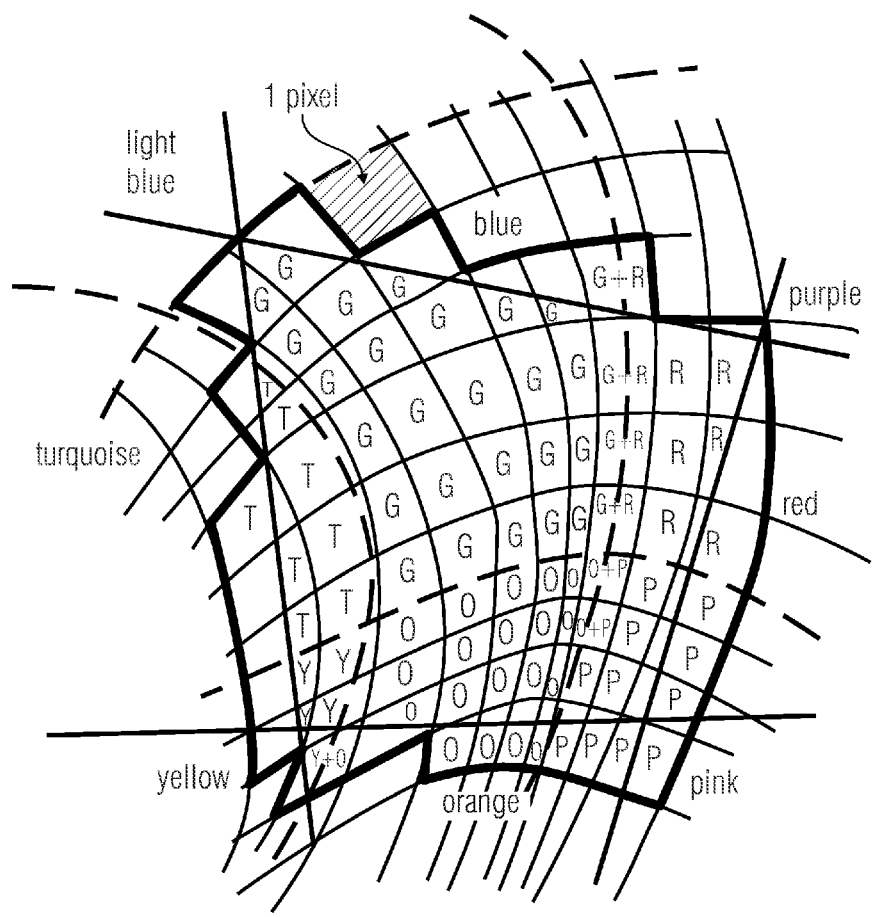
FIG. 8 schematically illustrates the portions of the transformed calibration chart model and of the camera image of FIG. 6 with a boundary of the selected region being approximated by a circumscribing shape.

FIG. 8 is largely similar to FIG. 7. The approximating shape in FIG. 8 is a circumscribing shape. Again, the pixels containing particular colors can be counted:
  Green: 25 pixels
  Orange: 19 pixels
  Pink: 10 pixels
  Turquoise: 8 pixels
  Red: 6 pixels
  Yellow: 4 pixels
  Green and red: 4 pixels
  Orange and pink: 2 pixels
  Yellow and orange: 1 pixel
  Total: 79 pixels FIG. 9 illustrates an effective and simple approach to calculate a sum of pixel values within a polygon. The idea is to combine two shape approximations (kind of inner and outer shape approximation) of the polygon. Let $P=\{x_1, y_1, \ldots, x_n, y_n\}$ represent a polygonal region with a suitable number of vertices $x_i$, $y_i$ (in this context suitable means, that at least non axis-aligned lines of the polygon are represented by enough vertices and segments respectively, which is in our case assured by the resampling step). For convenience we define $x_{n+1}:=x_1$ and $y_{n+1}:=y_1$, similar to adding the first vertex to the end of the vertex list. Furthermore let $I(x, y)$ be the value in the integral image at pixel position x, y. Then the sum $s_P$ of all pixel values within the polygon region can be approximated by $$S_P \approx 0.5 \sum_{i=1}^{n} [I(x_i, y_{i+1}) - I(x_{i+1}, y_i)].$$

FIG. 9 illustrates this equation and shows that the integral image values at the polygon vertices are eliminated because they are added by one approximation and subtracted by the other approximation. In other words, FIG. 9 schematically illustrates an inner and outer shape approximation of a polygon (solid line). The values of the integral image at the vertex positions are eliminated. The value $s_p$ might be the negative of the sum depending on the orientation of the polygon, however this can easily be eliminated. The integral image $\hat{I}$ of a helper image with each pixel value being 1 could be used to calculate the area of the region defined by the polygon (as described at another place in this disclosure). However, it can easily be shown that $\hat{I}(x, y) = x \cdot y$, which could also be calculated during shape integration.

Figure 10:
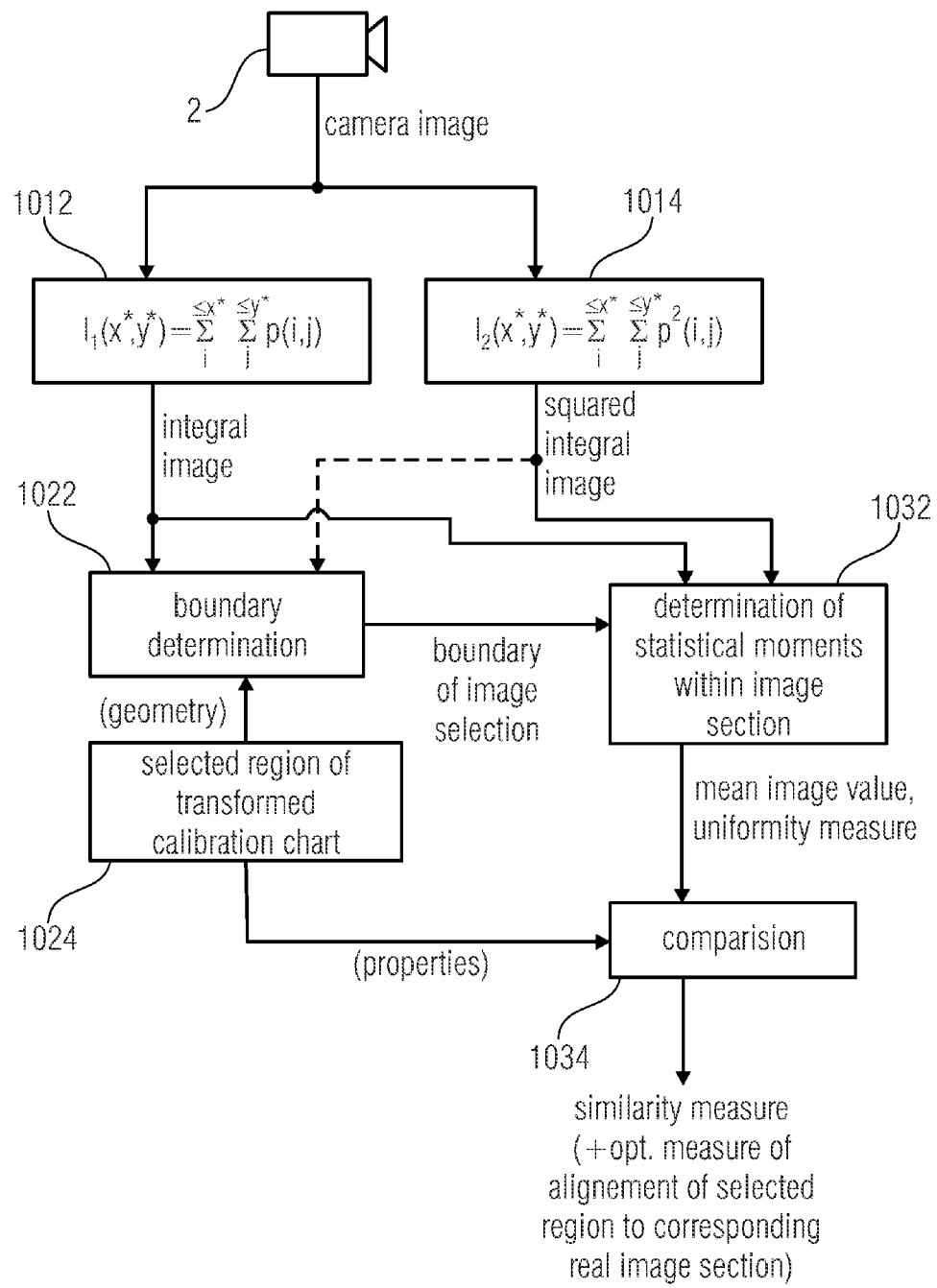
FIG. 10 shows a schematic block diagram illustrating a processing of the camera image and of the selected region to determine a similarity measure between the selected region and an associated image section of the camera image.

FIG. 10 shows a schematic block diagram illustrating a possible processing of the camera image provided by the camera 2 to be calibrated.

The camera image is fed to an integral image calculation block 1012 and to a squared integral calculation block 1014. The integral image calculation block 1012 determines for each pixel position x*,y* of the camera image an integral image value $I_1(x^*,y^*)$. The variables x* and y* are integers for the purposes of indexing individual pixels within the integral image and denote the coordinates in the camera-related coordinate system. Each pixel of the integral image $I_i(x^*, y^*)$ is determined by summing the pixel values p(i,j) for which $i \leq x^*$ and $j \leq y^*$. In other words, the pixel values p(i,j) are integrated up to the current pixel position. The squared integral image $I_2(x^*,y^*)$ is determined in a similar manner, however the pixel values p(i,j) are squared prior to adding.

In addition to the integral image $I_1$ and the squared integral image $I_2$, it may be useful to determine the number of pixels within the image section (which is associated (or aligned) to the selected region). The number of pixels within the image section may be in the context of determining statistical moments of the image section, as will be described below.

The integral image $I_1$ is forwarded to a boundary determination block 1022. Another input for the boundary determination block 1022 is a geometry of the selected region of the transformed object (e.g., calibration chart). The geometry of the selected region describes how, using a current set of camera parameters, a specific region of the real object is transformed. The boundary determination block 1022 then approximates a boundary of the selected region within a coordinate system of the integral image $I_1$. For example, the boundary of the selected region may be approximated by means of segments that are parallel to the axes of the integral image $I_1$. In addition or in the alternative to the integral image $I_1$, the boundary determination block 1022 may also receive the squared integral image $I_2$ or the original camera image as an input, because the axes of the camera image, of the integral image $I_1$, and of the squared integral image $I_2$ are typically the same. The integral image may be made one pixel wider and higher by adding a new first line and a new first column filled with zeros.

The approximated boundary of the selected region, the integral image I1 and the squared integral image I2 are fed to a block 1032 for a determination of statistical moments within the (boundary-approximated) image section that corresponds to the selected region. This may be achieved by evaluating the integrated image values and the squared integrated image values at the boundary of the image section, for example using the discrete Green's theorem. In this manner, the statistical moments of the image section corresponding to the selected region can be determined in a very efficient manner. The block 1032 outputs the statistical moments, for example a mean image value and a uniformity measure of the camera image values within the image section that corresponds to the selected region. The uniformity measure describes whether the image values occurring in the image section are relatively similar (i.e., substantially the same color, shade of color, or shade of gray) or widespread (i.e., several different colors, shades of color, or shades of gray).

Note that the camera image provided by the camera 2 may be split into two or more color component pictures and for each color component an individual integral image and an individual squared integral image may be calculated. Furthermore, also the determination of the statistical moments may be performed in a color component-individual manner.

The statistical moments (e.g., mean image/color value within image section, uniformity measure) is then provided to a comparison block 1034 which compares the determined statistical moments with corresponding properties of the selected region. A result of this comparison is a similarity measure. Optionally, the comparison block 1034 may output a measure of alignment of the selected region to the corresponding real image section.

In some embodiments the similarity measure may take into account a relation between two or more regions. In particular this may be of interest when some information about one or more regions is not a-priori known as an absolute value, but only a relation between the two or more regions is a-priori known. For example, the color of a first object region of the known object region may not (or not exactly) be known, but only that this first object region is brighter or darker than a second object region of the object. Besides a brighter/darker relation other relations are also imaginable, e.g. a lower-higher relation, a stronger-weaker relation, etc. The fact that in the transformed object the a-priori known relation between the first object region and the second object region is represented in a correct manner has an influence on the similarity measure of at least one of the first and second object regions, that is, the similarity measure will typically have a higher score if the a-priori known relation is observed in the transformed object. Hence, the transformation of the object model from the first frame of reference to the second frame of reference can be assumed to treat the relation between the first and second object regions in a correct manner. To give an example: A black-and-white camera may acquire an image of a colored object, e.g. a traffic sign with a red region, a white region, and a black region. The image acquired by the black-and-white camera is a gray-scale image, hence the color "red" will appear as a shade of gray in the image. In the object model describing the traffic sign the white region may be defined as being brighter than the red region. Likewise, the red region may be defined as being brighter than the black region. It follows from these two conditions that the white region is brighter than the black region, too. Furthermore, the object model may define that the white region (black region) is one of the brightest regions (darkest regions) occurring in the image acquired by the black-and-white camera. Such a condition may also be evaluated when determining the similarity measure. Note that in some embodiments a group of two or more related regions may be regarded (and treated) as one large, combined region for the purpose of determining the region-related similarity measure for the large, combined region.

As long as the camera image is not modified, the integral image $I_1$ and the squared integral image $I_2$ are constant, as well. This means that the integral image $I_1$ and the squared integral image $I_2$ need to be calculated only once, as long as the camera image is not modified. The optimization of the estimation of the camera parameters only affects geometry of the selected region and therefore the boundary determination block 1022. As the determination of the statistical moments within the image section of interest can be implemented in a very efficient manner using the integral image $I_1$ and the squared integral image $I_2$, the computational costs per optimization step are relatively small.

Figure 11:
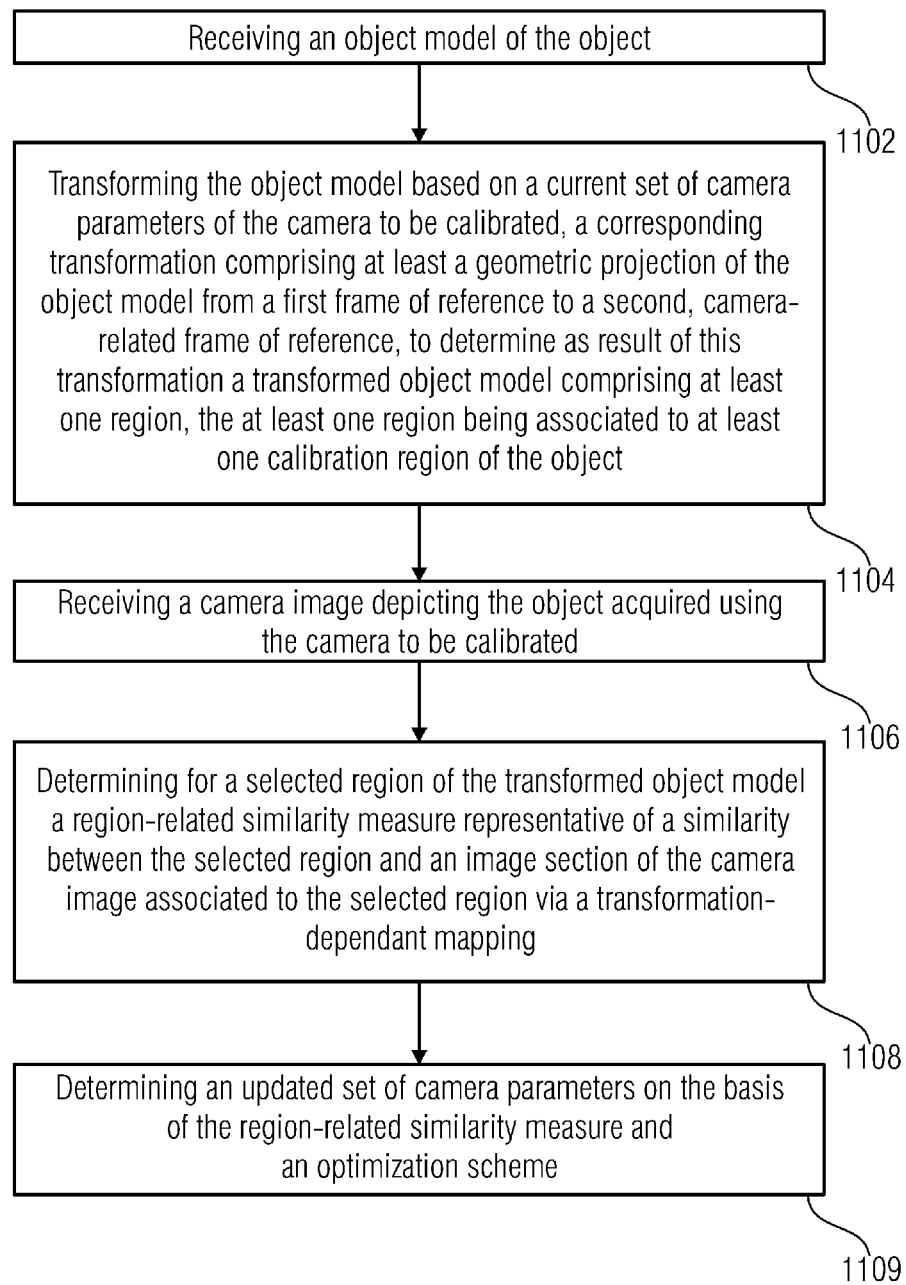
FIG. 11 shows a schematic flow diagram of a method for determining camera calibration parameters according to the teachings disclosed herein.

FIG. 11 schematically illustrates a flow diagram of a method for determining camera calibration parameters according to one or more embodiments of the teachings disclosed herein. During a first step 1102 an object model is received of an object to be used for calibrating the camera. The object is typically known so that the object model is available. For example, the object may be calibration chart comprising several regions of different color.

The object model is then transformed based on a (current) set of camera parameters of the camera to be calibrated, as indicated at block 1104 of the flow diagram in FIG. 11. A corresponding transformation comprises at least a geometric projection of the object model from a first frame of reference to a second, camera-related frame of reference. As a result of this transformation a transformed object model is determined which comprises at least one region. The at least one region is associated to at least one calibration region of the object (e.g., a region of a single color of the real object).

At a block 1106 of the flow diagram in FIG. 11 a camera image is received. The camera image depicts the object acquired using the camera to be calibrated. By means of the camera image the quality of the transformation, and hence of the currently estimated set of camera parameters, can be verified. In other words, the camera image serves as a reference.

For a selected region of the transformed object model a region-related similarity measure is determined at a step 1108. The similarity measure is representative of a similarity between the selected region and an image section of the camera image associated to the selected region via a transformation-dependent mapping. Some possible options for determining the region-related similarity measure are described in this document.

At a step 1109 of the method for determining camera calibration parameters an updated set of camera parameters is determined on the basis of the region-related similarity measure and an optimization scheme.

As camera calibration is only one of many possible applications of a method according to at least some embodiments disclosed herein, the flow diagram may also be presented in a more general form. During the first step 1102 an object model is received of an object to be used for performing the method. The object is typically known so that the object model is available. The object model is then transformed based on a (current) set of model parameters. This action corresponds to block 1104 of the flow diagram in FIG. 11. A corresponding transformation transforms the object model from a first frame of reference to a second frame of reference. As a result of this transformation a transformed object model is determined which comprises at least one region. The at least one region is associated to at least one object region of the object (e.g., a region of a single color of the real object).

During an action corresponding to the block 1106 of the flow diagram in FIG. 11, an image is received. The image depicts the object acquired using an acquisition device. By means of the image the quality of the transformation, and hence of the currently estimated set of model parameters, can be verified. In other words, the image serves as a reference. For a selected region of the transformed object model a region-related similarity measure is determined (corresponding to step 1108 of the flow diagram in FIG. 11). The similarity measure is representative of a similarity between the selected region and an image section of the camera image associated to the selected region via a transformation-dependent mapping. Some possible options for determining the region-related similarity measure are described in this document. During an action corresponding to the step 1109 of the flow diagram in FIG. 11, an updated set of model parameters is determined on the basis of the region-related similarity measure and an optimization scheme.

The described system (in particular in FIGS. 4 and 9) is one possible realization of the calibration framework. Some possible variations of the system are as follows:

Further parameters could be added to the parameter vector to model the real world system even better, or parameters could be changed. For example tangential distortion or lighting conditions could be modeled as well. Moreover, also the calibration object (chart) could be parameterized, e.g. the opening angle of a foldable (nonrigid) calibration chart could be modeled with an additional parameter.

Chromatic aberration could be parameterized and modeled as well. Therefore the polygons that describe the borders of the color patches could be deformed separately for each color band before the region integration block 412 (similar to the lens distortion block 408).

The system and especially the error function block 422 could make use of various color spaces. For example the CIE Lab color space with visual equidistance or the RGB color space could be used. Usage of raw sensor data could be taken into account as well.

Instead or in addition to the camera image, also preprocessed or transformed versions of the image could be used in the system (e.g. edge images or intensity images). The term "camera image" encompasses such preprocessed or transformed versions of the image. Moreover, not only intensity or color images but also depth images could be taken into account.

Calculating and using the image of squared pixel values and the appropriate integral image to calculate pixel variances in the polygon regions was proposed. Instead, each polygon region could be divided into an arbitrary number of subregions and the variance of the whole polygon region could be approximated by the variance of the mean values of the subregions. This could result in a speed and memory optimization, because fewer integral images have to be calculated and stored.

The optimization of the color transformation parameters could be based not on the whole color patches (selected region), but skipping a margin of the color patches to avoid errors if the color patch was not fitted very well in the image. For this purpose each color patch could be modeled by a polygon that defines the exact border and one that is decreased by a margin.

The optimization procedure could include only some color patches in the beginning (until some convergence is reached) and add the other patches step by step to decrease computational costs.

Not only the border and the reference color (or intensity) of the patches could be modeled, but also a frame around the color patch and the corresponding color and intensity of the frame (background). They can be incorporated in the error vector as well.

The polygon resampling block could use a high threshold for the maximum segment length in the beginning and reduce it during optimization to lower the computational load due to fewer vertices.

In addition or instead of the colors (intensities) and variances of the polygon regions, also higher order moments could be calculated and used.

The polygon resampling block could also follow other resampling strategies, e.g., an adaptive method that adjusts the number of additional vertices depending on the size of the chart (or polygons) in the image.

Graylevel or black and white calibration charts could be used and processing could be done on graylevel images if only geometric calibration, calibration of camera curve or white balance is necessitated.

Integration of polygonal regions could be improved with subpixel precision by interpolation in the integral image.

In general only parts of the calibration chart could be modeled and included in the optimization procedure, e.g., only some of the color patches (regions). Furthermore also the regions between the color patches could be modeled and included in the optimization process.

Using only a single image or view of the calibration pattern could result in an underdetermined system. Therefore multiple views or images could be incorporated in the calibration procedure, simultaneously or step by step.

Arbitrary color corrections or mappings could be modeled and parameterized instead of using only a 3×3 linear color mapping.

The color transformation block 416 could also be placed before the integral image computation 414 and applied to each pixel in the image, however in this case the integral image has to be updated during optimization whenever the color mapping parameters change.

Each element of the error vector could be multiplied with a separate weighting factor, to emphasize certain components of the error vector or focus the calibration to certain color patches. The weights could also be based on the size of the polygon regions in the calibration chart or image.

Some of the benefits of the proposed calibration framework are as follows:

The system unifies colorimetric and geometric camera calibration in a closed form solution and can also be applied to commercially available calibration charts.

Due to the integration of the polygon regions it is highly robust with respect to sensor noise, because noise with zero mean is eliminated in the integration step.

All the components of this calibration framework can be implemented very efficiently resulting in low computational costs. Moreover all but the integral image computation cost is independent of the image size. The algorithms also fit perfectly for parallelization and realization on special hardware (e.g. graphics cards).

The proposed system can be used in many applications where camera calibration is advantageous, e.g.:

Integration into image manipulation programs for geometric and color calibration of photographs.

Due to the efficiency of the algorithms it could also be integrated into consumer or professional cameras to simplify the calibration procedure. The camera could automatically calibrate itself as soon as it detects the calibration chart in the image. Therefore the photographer only has to put the calibration chart in front of the camera once to calibrate the system, if the light or camera setup changed.

The system can be used to conduct geometric and colorimetric calibration of multi-camera setups (e.g., stereo cameras). This is advantageous for example in 3-D productions.

Determining a Measure of Region of a Two-Dimensional Picture Representation Using an Integral Image In connection with the apparatus/method for determining model parameters it may be interesting to employ an apparatus/method for determining a measure of a region of a two-dimensional picture representation using an integral image and/or a corresponding method. For example, such a method for determining a measure of a region of a two-dimensional picture representation may use an integral image of the two-dimensional picture representation (higher dimensional picture representations are also imaginable).

In P. Viola and M. Jones, Rapid object detection using a boosted cascade of simple features, in IEEE Conference on Computer Vision and Pattern Recognition, volume 1, pages 511-518, Kauai, Hi., USA, April 2001, Viola and Jones proposed a framework for rapid object detection. They used Haar-like rectangle features and AdaBoost to train a classifier cascade for object detection. They proposed the integral image for fast feature extraction. Each pixel in the integral image contains the sum of all the pixels to the left and to the top of the pixel. Therefore the integral image can be used to calculate the sum of all pixels in a rectangular region by adding the upper left and lower right and subtracting the upper right and lower left corner pixel values. To this end, summing up all the pixels in a rectangular region of arbitrary size can be done by only four look-ups in the integral image in constant time.

Afterwards Haar-like features and applications of the integral image have been used in numerous publications and various improvements were proposed. However all of them are based on rectangular regions or combinations of rectangular regions.

Yin and Collins (Z. Yin and R. T. Collins, Object tracking and detection after occlusion via numerical hybrid local and global modeseeking, in Computer Vision and Pattern Recognition, 2008. CVPR 2008. IEEE Conference on, page 1-8, 2008) proposed that an arbitrary image region can be split up in rectangles with edges parallel to the coordinate axes. Therefore the sum inside an arbitrary region can be calculated by summing up all the rectangular regions with help of the integral image.

Mohr and Zachmann (D. Mohr and G. Zachmann, FAST: fast adaptive silhouette area based template matching, in Proceedings of the British Machine Vision Conference, pages 39.1-39.12, 2010) also proposed to approximate an arbitrary area by a set of rectangles with axis-aligned edges. They used the method for fast template matching based on a probability image where each pixel contains the probability whether the pixel belongs to the object or not.

They also adopted the integral image to obtain a scalable and resolution independent solution.

The rectangle based region approximation has several advantages compared to previous approaches. It provides a very fast and scalable way to calculate the sum of pixel values within an arbitrary image region. However it has several drawbacks for various applications.

Figure 20A:
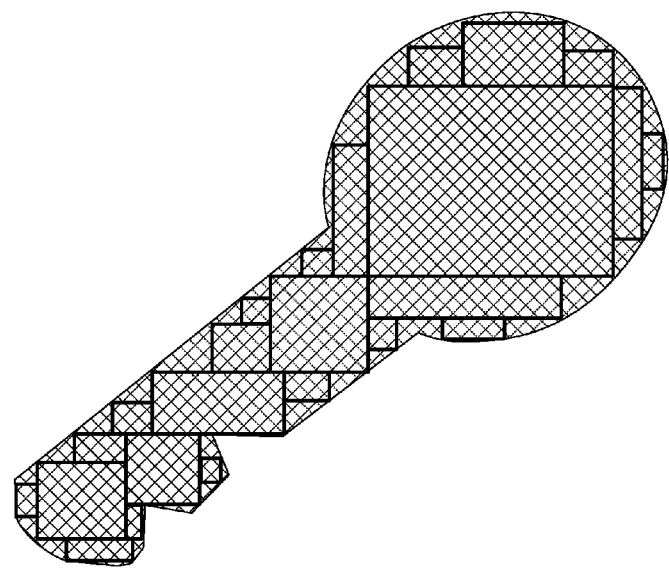
FIG. 20a shows an example of an arbitrary region approximated by axis aligned rectangles.

An example of an arbitrary region that is approximated by axis-aligned rectangles is shown in FIG. 20a. It takes four numerical values to store each rectangle and four look-ups in the integral image to calculate the sum of the pixel values in the rectangle. A total amount of 4N numerical values and look-ups is needed to store the region approximation and calculate the sum of pixel values respectively.

Figure 20B:
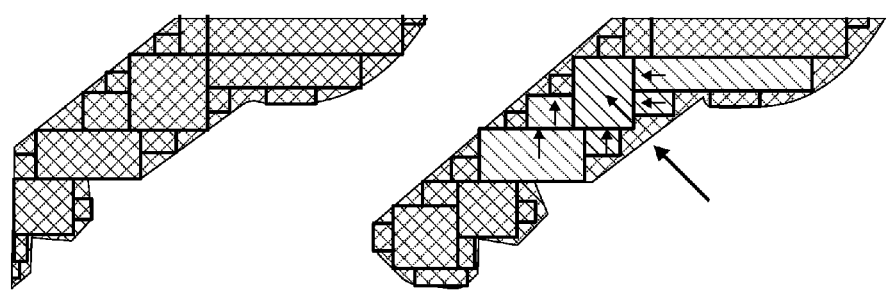
FIG. 20b shows an example of a small manipulation of the approximated region with emphasis on all the rectangle corners that are involved in the manipulation.

Assuming a region defined by an arbitrary polygon has to be approximated, an algorithm is necessitated that splits up the polygonal region in non-overlapping rectangles. This can be a time consuming and challenging task. Moreover if one wants to modify or manipulate the approximation, one has to deal with all corners of all the rectangles that are involved in the manipulation. FIG. 20b shows a small manipulation of the region boundary. Even in this primitive case of moving one rectangle corner all the emphasized rectangles have to be manipulated.

The need for an algorithm that is able to approximate a region with non-overlapping rectangles and the difficulties involved in region manipulation are both drawbacks that have to be considered in many applications.

One option for dealing with these drawbacks is offered by an apparatus for determining a measure of a region of a two-dimensional (or higher-dimensional) picture representation using an integral image of the two-dimensional picture representation. The apparatus comprises a first determiner being configured to determine a closed curve approximating a border of the region such that the closed curve is a polygon comprising at least six axis parallel segments parallel to axes of the integral image. Furthermore, the apparatus comprises a second determiner being configured to determine the measure of the region by alternately adding and subtracting values of the integral image at vertices of the polygon.

A corresponding method for determining a measure of a region of a two-dimensional (or higher dimensional) picture representation uses an integral image of the two-dimensional picture representation. The method comprises the step of determining a closed curve approximating a border of the region, such that the closed curve is a polygon comprising at least six axis parallel segments parallel to axes of the integral image. Furthermore, the method comprises a step of determining the measure of the region by alternately adding and subtracting values of the integral image at vertices of the polygon.

In particular, the proposed apparatus and method for determining a measure of a region may be used in the context of determining model parameters where a corresponding model describes how an object is transformed from a first frame of reference (typically within the "real" world of the acquired real object) to a second frame of reference (typically defined with respect to the image, i.e., the result of the acquisition process).

An arbitrary region (for example, a selected region mentioned above in the context of the determination of model parameters) can be described by a much more flexible and compact shape description that has none of the drawbacks tied to the rectangle based approximation when only axis parallel segments (for example horizontal and vertical segments) that approximate the border of the region are used. This efficient shape representation for arbitrary regions can be used to calculate rapidly a measure of the region defined by the closed curve by alternately adding and subtracting values of the integral image at vertices of the polygon comprising the axis parallel segments.

In the following, the closed curve may also be designated as shape, and an axis parallel segment may also be designated as segment.

Compared to the rectangle based method it is very easy to calculate the measure of the region, because only the border of the region has to be considered for calculating the measure of the region, as the measure is calculated by adding and subtracting values at vertices of the polygon, which is a closed curve approximating the border of the region. For the above mentioned determination of model parameters, the acquired image is evaluated within the image section that is mapped to the transformed selected region. The transformed selected acts as a mask or template that described the image section within the acquired image. Various measures of the image section can be determined in a fast and efficient way. An average image value within the image section can be determined by determining the total sum of image values (e.g., pixel values) within the image section. The total number of pixels within the image section may also be determined by evaluating the image section in an auxiliary integral image in which all the pixels have the same value, for example, "1". The average image value within the image section is then the ratio of total sum over total number of pixels in the image section that corresponds (via the transformation-dependent mapping) to the selected region.

As can be seen from FIG. 20a, for calculating a measure of the region shown in FIG. 20a all vertices of all rectangles have to be taken into account, as for each rectangle a measure has to be calculated. Therefore, not only the boundary of the region has to be considered in the rectangle based approach, but additionally also vertices of rectangles lying in the arbitrary region.

Two vertices of the polygon may be connected by one axis parallel segment. In other words, a starting point of an axis parallel segment is a first vertex and an endpoint of the axis parallel segment is a second vertex, for example, succeeding the first vertex when traveling on the closed curve.

The vertex of the polygon may be an endpoint of an axis parallel segment parallel to the first axis of the integral image and a starting point of an axis parallel segment being parallel to a second axis of the integral image. In other words, when traveling on the closed curve, horizontal axis parallel segments parallel to a first axis of the integral image and vertical axis parallel segments parallel to the second axis of the integral image alternate. As an example, an edge of the region not parallel to an axis of the integral image can be approximated using at least two axis parallel segments, wherein a first one of the axis parallel segments is parallel to the first axis of the integral image and a second one of the axis parallel axis is parallel to the second axis of the integral image.

Figure 12A:
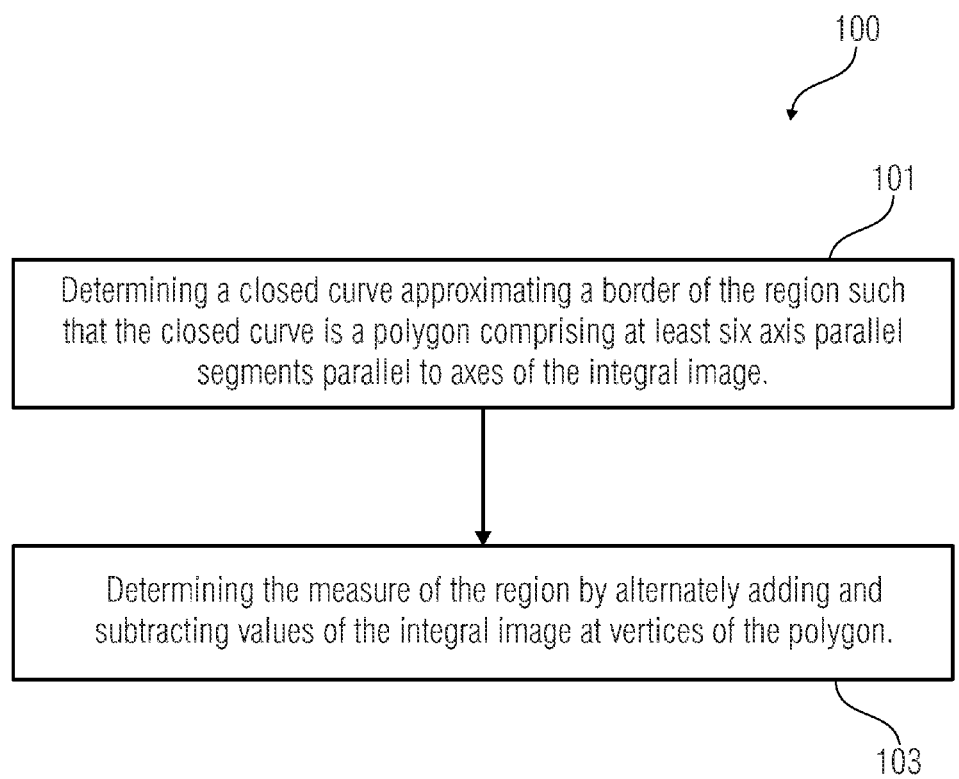
FIG. 12a shows a flow diagram of a method according to an embodiment of the present invention.

FIG. 12a shows a flow diagram of a method 100 for determining a measure of a region of a two-dimensional picture representation using an integral image of the two-dimensional picture representation. The method 100 comprises a step 101 of determining a closed curve approximating a border of the region, such that the closed curve is a polygon comprising at least six axis parallel segments parallel to axes of the integral image.

Furthermore, the method 100 comprises a step 103 of determining the measure of the region by alternately adding and subtracting values of the integral image at vertices of the polygon.

As described above, by approximating a border of the region using axis parallel segments instead of rectangles a much more flexible and compact shape description can be achieved that has none of the drawbacks tied to the rectangle based approximation. Furthermore, the measure of the region (for example, the sum of all pixels of the region) can be easily determined by alternately adding and subtracting values of the integral image at the vertices of the polygon. Hence, compared to the rectangle based approximation only the vertices of the polygon, which approximate the border of the region, need to be stored and are used for calculating the measure of the region, instead of vertices inside the region as in the rectangular based approach.

As mentioned before, in an integral image each pixel can contain the sum of all the pixels to the left and to the top of the pixel. Hence, by alternately adding and subtracting the values of the integral image at the vertices of the polygon, the sum of pixel values in the image region defined by the shape or the closed curve can be calculated rapidly for arbitrary regions.

Figure 12B:
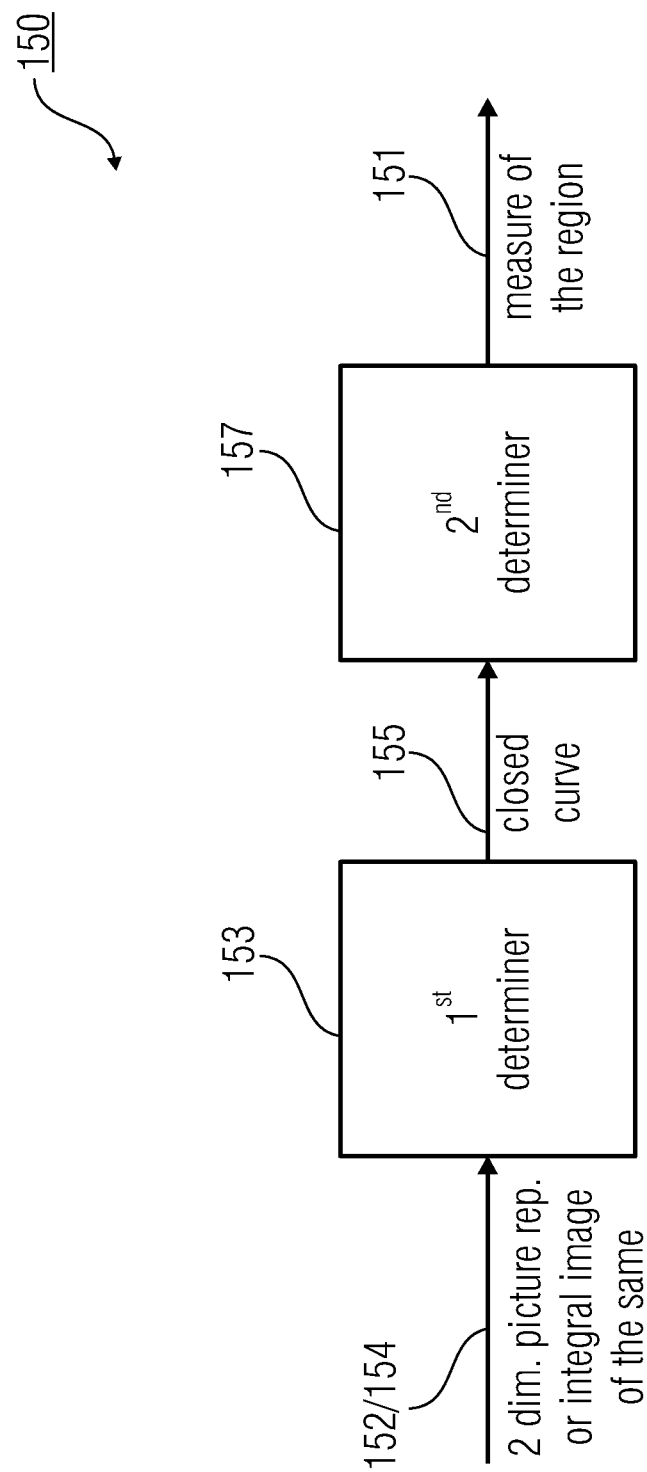
FIG. 12b shows a block schematic diagram of an apparatus according to an embodiment of the present invention.

FIG. 12b shows an apparatus 150 for determining a measure 151 of a region of a two-dimensional picture representation 152 using an integral image 154 of the two-dimensional picture representation 152. The apparatus 150 comprises a first determiner 153 configured to determine a closed curve 155 approximating a border of a region, such that the closed curve 155 is a polygon comprising at least six axis parallel segments parallel to axes of the integral image 154.

Furthermore, the apparatus 150 comprises a second determiner 157 configured to determine the measure 151 of the region by alternately adding and subtracting values of the integral image 154 at vertices of the polygon. In other words, the apparatus 150 can be configured to perform the method 100.

The first determiner 153 may receive the two-dimensional picture representation 152 and may be configured to determine the integral image 154 of the same or may be configured to receive the already determined integral image 154 of the two-dimensional picture representation 152.

Further (optional) features described in the following in conjunction with the apparatus 150 are applicable also to the method 100, and vice versa.

As a list in brief note form, some aspects of the teachings relative to determining a measure of a region of a two-dimensional picture or image may be presented as follows:

Apparatus (150) for determining a measure (151) of a region ($211_1$, $211_2$, 401) of a two-dimensional picture representation (152) using an integral image (154) of the two-dimensional picture representation (152), the apparatus (150) comprising: a first determiner (153) being configured to determine a closed curve (155, $155_1$ to $155_5$) approximating a border of the region ($211_1$, $211_2$, 401) such that the closed curve (155, $155_1$ to $155_5$) is a polygon comprising at least six axis parallel segments parallel to axes of the integral image (154); and a second determiner (157) being configured to determine the measure (151) of the region ($211_1$, $211_2$, 401) by alternately adding and subtracting values of the integral image (154) at vertices of the polygon.

The first determiner (153) may be configured to determine the closed curve (155, $155_1$ to $155_5$) such that two vertices of the polygon are connected by one axis parallel segment.

The first determiner (153) may be configured to determine the closed curve (155, $155_1$ to $155_5$) such that, when traveling on the closed curve (155, $155_1$ to $155_5$) horizontal axis parallel segments parallel to a first axis of the integral image (154) and vertical axis parallel segments parallel to a second axis of the integral image (154) alternate.

The first determiner (153) may be configured such that each single non-axis parallel edge of the region ($211_1$, $211_2$, 401) is approximated by a sequence of at least one horizontal axis parallel segment being parallel to a first axis of the integral image (154) and at least one vertical axis parallel segment being parallel to at least a second axis of the integral image (154).

Each vertex of the polygon may be associated to an x-coordinate value of a two-dimensional xy-coordinate system of the integral image (154) and to a y-coordinate value of the two-dimensional xy-coordinate system, wherein the first determiner (153) is configured to determine the closed curve (155, $155_1$ to $155_5$) such that, when traveling on the closed curve (155, $155_1$ to $155_5$), successive vertices differ either in the x-coordinate or the y-coordinate.

The second determiner (157) may be configured to determine the measure (151) of the region ($211_1$, $211_2$) such that for each vertex of the polygon a value of the integral image (154) neighboring the vertex is added or subtracted.

A horizontal axis of the integral image (154) may extend along an x-coordinate direction of a two-dimensional xy-coordinate system of the integral image (154) and a vertical axis of the integral image (154) may extend along a y-coordinate direction of the two-dimensional xy-coordinate system. Furthermore, the second determiner (157) may be configured to choose, for a vertex (201) of the polygon, the value for adding or subtracting to determine the measure (151) of the region ($211_1$, $211_2$) as a value (A) of the integral image (154) neighboring the vertex (201) and being associated to a preceding x-coordinate and a preceding y-coordinate relative to the vertex (201). As an alternative to the preceding x-coordinate and the preceding y-coordinate a rounded x-coordinate and a rounded y-coordinate may be used.

The second determiner (157) may be configured to determine the measure (151) of the region ($211_1$, $211_2$) such that for a vertex of the polygon lying at the border of the integral image (154), for which the value neighboring the vertex and being associated to a preceding x-coordinate and a preceding y-coordinate lies outside the integral image (154), the value is chosen to be zero.

The first determiner (153) may be configured to change vertices of the polygon corresponding to a change of the region ($211_1$) of the two-dimensional picture representation (152); and the second determiner (157) may be configured to determine a measure of the changed region ($211_2$) by subtracting and adding old values of vertices ($201_1$) which are changed or removed by the first determiner (153) from and to the measure (151) of the region ($211_1$), such that an old value which has been added to determine the measure (151) of the region ($211_1$) is subtracted from the measure (151) of the region ($211_1$) and an old value which has been subtracted to determine the measure (151) of the region ($211_1$) is added to the measure (151) of the region ($211_1$) and by alternately adding and subtracting new values at changed or new vertices ($201_1$, $201_2$, $201_3$) of the polygon to the measure (151) of the region ($211_1$).

A horizontal axis of the integral image (154) may extend along an x-coordinate direction of a two-dimensional xy-coordinate system of the integral image (154) and a vertical axis of the integral image (154) may extend along a y-coordinate direction of the two-dimensional xy-coordinate system of the integral image (154). The first determiner (153) may be configured to shift a vertex ($201_1$) of the corresponding to a change of the border of the region ($211_1$) in the x-coordinate direction or the y-coordinate direction and to additionally change only one vertex neighboring the shifted vertex on the closed curve (155) when the shifted vertex is shifted either in the x- or the y-direction and changing only the two vertices ($201_2$, $202_3$) neighboring the shifted vertex ($201_1$) on the closed curve (155, $155_4$, $155_5$) when the shifted vertex ($201_1$) is shifted in the x-direction and the y-direction.

The first determiner (153) may be configured to determine the closed curve ($155_1$) approximating the border of the region (401) such that the polygon is completely surrounded by the border of the region (401). The first determiner (153) may be configured to determine the closed curve ($155_2$) approximating the border of the region (401) such that the border of the region (401) crosses an axis parallel segment.

The first determiner (153) may be configured to determine the closed curve ($155_2$) such that the border of the region (401) crosses the axis parallel segment in the center of the axis parallel segment.

The first determiner (153) may be configured to determine the closed curve ($155_2$) such that a first vertex ($403_1$) of the polygon lies outside the region (401) and, when traveling on the closed curve ($155_3$), a second vertex ($403_2$) succeeding the first vertex ($403_1$) lies inside the region (401).

The first determiner (153) may be configured to determine the closed curve ($155_3$) such that a first vertex ($403_3$) of the polygon lies outside the region (401) and, when traveling on the closed curve ($155_3$), a second vertex ($403_4$) succeeding the first vertex ($403_3$) lies on the border of the region (401).

The first determiner (153) may be configured to adjust a precision of the approximation of the border of the region with the closed curve by changing a maximum fixed length of the axis parallel segments of the polygon.

The region ($211_1$, $211_2$) may comprise a plurality of pixels, each pixel having a pixel value; and wherein the second determiner (157) may be configured to determine the measure (151) of the region ($211_1$, $211_2$) such that it describes the sum of the pixel values of all pixels of the two dimensional picture representation (152) inside the region ($211_1$, $211_2$).

Each value of the integral image (154) may be associated to a coordinate position of a two-dimensional xy-coordinate system of the integral image (154). The first determiner (153) may be configured to determine a further integral image of the two-dimensional picture representation (152) in which each pixel value of each pixel of the two-dimensional picture representation (152) is set to the same value. The second determiner (157) may be configured to determine a further measure of the region in the further integral image by alternately adding and subtracting values of the further integral image at the same coordinate positions as the values of the integral image (154) used to determine the measure (151) of the region, such that the further measure of the region describes a number of pixels in the region.

The second determiner (157) may be configured to calculate the mean value of all pixels in the region based on the measure of the region and the further measure of the region.

A method (100) for determining a measure (151) of a region ($211_1$, $211_2$, 401) of a two-dimensional picture representation (152) using an integral image (154) of the two-dimensional picture representation (152) is also proposed, the method (100) comprising:

determining (101) a closed curve (155, $155_1$ to $155_5$) approximating a border of the region ($211_1$, $211_2$, 401) such that the closed curve (155, $155_1$ to $155_5$) is a polygon comprising at least six axis parallel segments parallel to axes of the integral image (154); and determining (103) the measure (151) of the region ($211_1$, $211_2$, 401) by alternately adding and subtracting values of the integral image (154) at vertices of the polygon.

Figure 14:
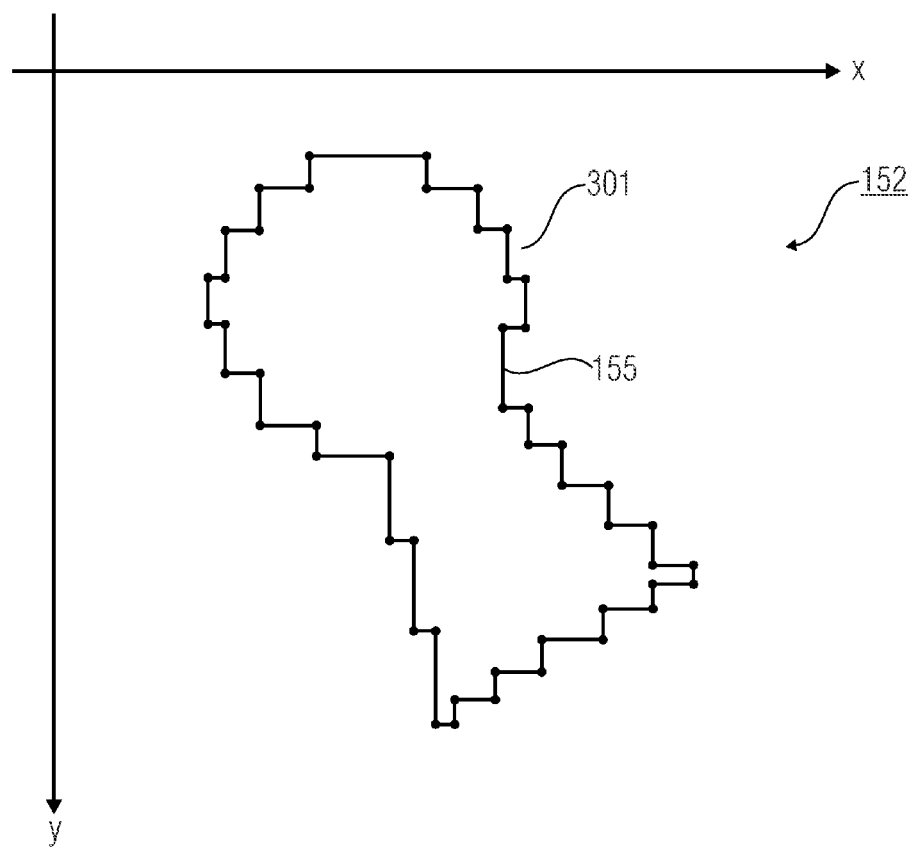
FIG. 14 shows an example for a closed curve or a shape comprising only segments that approximate the boundary of a region, wherein all segments are parallel to the axis.
Figure 17:
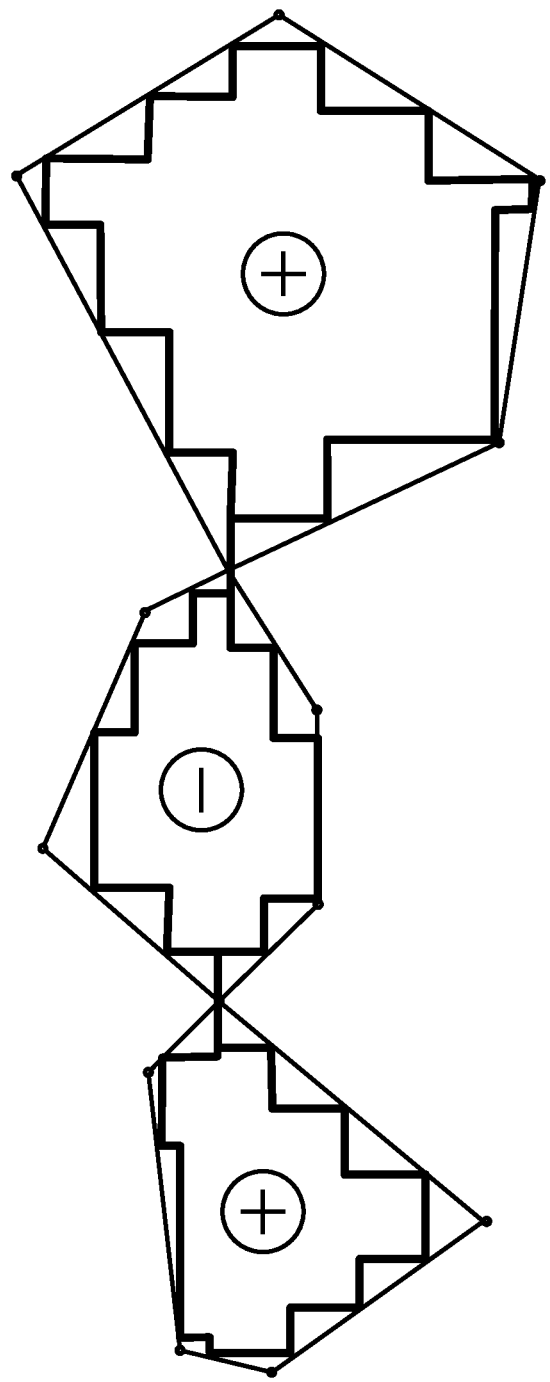
FIG. 17 shows an example for different closed regions of shapes with intersections which are added or subtracted depending on the orientation.

FIG. 14 shows an example for a region 301 of a two-dimensional picture representation 152, a border of which is approximated using a closed curve 155 by the first determiner 153. The closed curve 155 is a polygon, which comprises a plurality of axis parallel segments parallel to an axis of the two-dimensional picture representation 152. As an example, the two-dimensional picture representation 152 can comprise (or be based on) a two-dimensional xy coordinate system having a first coordinate axis (for example an x-coordinate axis or a horizontal axis) and a second coordinate axis (for example a y-coordinate axis or a vertical coordinate axis). The axes of the two-dimensional picture representation 152 may be equal to the axes of the integral image 154 of the two-dimensional picture representation 152, such that the axis parallel segments of the closed curve 155 parallel to the axes of the two-dimensional picture representation 152 are parallel to the axes of the integral image 154, too. As can be seen from FIG. 14, all segments of the closed curve 155 are parallel to the axes and when traveling on the closed curve 155 axis parallel segments parallel to the first coordinate axis of the two dimensional picture representation 152 alternate with axis parallel segments parallel to the second coordinate axis of the two-dimensional picture representation 152.

Various representations of the shape are possible. The simplest form consists of $\tilde{S}=\{x_1, y_1, x_2, y_2, \ldots, x_n, y_n\}$ whereas $x_i$, $y_i$ are the x- and y-coordinates of the i-th corner (or vertex) of the shape related to the coordinate system of the two-dimensional picture representation 152. The vertices i and i+1 are adjacent and connected by a segment. Vertex n and vertex 1 describe the segment that closes the shape from the last vertex to the first one.

A closer look reveals redundancy in this representation. Successive vertices differ either in the x- or in the y-coordinate because only segments aligned with the axes are used. Therefore two successive x or y entries contain the same value and the representation can be shortened to $\tilde{S}=\{x_{n|1}, y_{1|2}, x_{2|3}, y_{3|4}, \ldots, x_{n-2|n-1}, y_{n-1|n}\}$. Another realization can represent a starting point and alternately displacements dx, dy in x- and y-direction, with $\tilde{S}=\{x_s, y_s, dx_1, dy_2, dx_3, dx_4, \ldots, dx_{n-1}, dy_n\}$. In this representation $\Sigma_i dx_i = 0$ and $\Sigma_i dy_i = 0$ holds, otherwise S is not a closed shape. Therefore the last displacements in x- and y-direction could be dropped (the starting point is known).

In other words, each vertex of the polygon can be associated to a first coordinate value and a second coordinate value of the coordinate system of the integral image 154 and two-dimensional picture representation 152, wherein when traveling on the closed curve 155 successive vertices differ either in the first coordinate (for example the x-coordinate) or the second coordinate (for the example the y-coordinate).

Another possibility is to describe the shape with a bounding box and the vertices relative to the bounding box in the same way already shown. Therefore the width, height and location of the shape can easily be manipulated by changing only the size or location of the bounding box.

Independent of the chosen representation the shape can be subject to any coordinate transform that is useful for the designated application. The order of x; y pairs can also be switched to y; x instead.

Compared to the rectangle based method it is very easy to approximate an arbitrary region with arbitrary precision using the described shape representation. A polygonal region for example is approximated with arbitrary precision by approximating each single edge of the polygon with a sequence of horizontal or vertical shape segments as shown in FIG. 15a.

In other words, according to a further embodiment each single non-axis parallel edge of the border of the region is approximated by a sequence of at least one horizontal axis parallel segment (for example being parallel to the first coordinate axis of the integral image) and at least one vertical axis parallel segment (for example being parallel to the second coordinate axis of the integral image).

Geometric forms other than the one shown in FIGS. 15a and 15b are easy to approximate as well, because only the boundary is considered. Depending on the application and the requirements the shape can be approximated with adjustable precision. As an example, segments with a fixed maximum length as well as segments with freely adjustable length can be employed. In other words, a resolution of the approximation of the border of the region with the closed curve can be adjusted by changing a maximum fixed length of the axis parallel segments of the polygon.

In addition, the approximation is not restricted to the inner region. It is also possible to approximate the mean or outer region as shown in FIG. 15b. In the case of the mean approximation the region border is crossed by the center of each (shape) segment.

FIG. 15b shows in the top picture an example wherein the closed curve $155_1$ approximating the border of a region 401 is determined by the first determiner 153 such that the polygon is completely surrounded by the border of the region, in a similar manner as in FIG. 7.

Furthermore, FIG. 15b shows in the middle picture an example in which the closed curve $155_2$ approximating the border of the region 401 is determined by the first determiner 153 such that the border of the region crosses an axis parallel segment. In the example shown in FIG. 15b, the border of the region crosses each axis parallel segment of the polygon. Furthermore, for at least some of the axis parallel segments of the polygon, the border of the region crosses an axis parallel segment in the center of the axis parallel segment.

Furthermore, a first vertex $403_1$ of the polygon (or of the closed curve) lies outside the region 401 and, when traveling on the closed curve $155_2$, a second vertex $403_2$ succeeding the first vertex $403_1$ lies inside the region 401.

Furthermore, FIG. 15b shows in the bottom picture an example for a closed curve $155_3$ which is determined such that a first vertex $403_3$ of the polygon (or of the closed curve $155_3$) lies outside the region 401, and when traveling on the closed curve $155_3$ a second vertex $403_4$ succeeding the first vertex $403_3$ lies on the border of the region 401 (see also FIG. 8). In other words, the closed curve $155_3$ surrounds the region 401.

From FIGS. 15a and 15b it can be seen that approximating an arbitrary region is a simple task with the shape representation (using axis parallel segments) and can be done easily with arbitrary precision.

Moreover, the shape representation (or the closed curve) can be manipulated in an easy and flexible way. Shifting a vertex in x- or y-direction affects exactly one neighboring vertex. For example, the x-direction may be a first coordinate direction of a two-dimensional xy-coordinate system of the two-dimensional picture representation and of the integral image. Furthermore, the y-direction may be a second coordinate direction of the two-dimensional xy-coordinate system of the two-dimensional picture representation and the integral image. Every axis parallel segment of the closed curve or polygon approximating a border of a region of the two-dimensional picture representation is parallel either to the first coordinate direction and therefore extends along the x-direction or parallel to the second coordinate direction and therefore extends along the y-direction.

Exactly two neighboring vertices are affected when shifting a vertex in x- and y-direction.

As an example, the first determiner 153 may be configured to shift a vertex of the polygon in response to a change of the border of the region in the x-direction or the y-direction and to additionally change (only) one vertex neighboring the shifted vertex on the closed curve when the shifted vertex is shifted either in the x- or the y-direction or to additionally change (only) the two vertices neighboring the shifted vertex on the closed curve when the shifted vertex is shifted in the x-direction and the y-direction.

FIG. 16 exemplifies manipulations of only one vertex. It can be seen that the shape can be manipulated in a flexible and easy way. Unlike the rectangle based method, only neighboring vertices are involved in the manipulation. From FIG. 16 it can be seen that by shifting one vertex in the x- and the y-direction only the two neighboring vertices have to be changed. This is a huge advantage compared to the rectangle based method as shown with FIG. 20b, in which entire rectangles have to be changed if only one vertex changes.

In the compact shape representation without redundancy for the closed curve, which was introduced above, each single entry can even be altered independently of all other entries, because each entry belongs to two vertices.

Furthermore, the shape representation allows to split-up, merge, add or remove the segments in an arbitrary way while keeping the start and end vertex location of the modified parts constant. Therefore, the shape can be altered in a flexible way that is advantageous for many applications. Some possible applications will be shown below.

The shape or the closed curve can be used to calculate the sum of all pixel values enclosed by the shape with the integral image in a very fast and comfortable way. By assigning alternately each value at the locations of the shape vertices in the integral image a positive or negative algebraic sign the sum of all pixel values within the region can be obtained by summing up these signed values. The order the algebraic sign is assigned to these values is defined by the order of the shape vertices. The algebraic sign of the first value determines whether the sum or the negative sum of all pixel values in the shape is obtained.

In other words, the measure 151 of the region determined by the method 100 or the apparatus 150 can be the sum of all pixel values of the two-dimensional picture representation 152 within the region (the border of which is approximated by the closed curve 155).

In the following, using the FIGS. 13a to 13c an example of calculating the sum of all pixels within a region of a two-dimensional picture representation 152 using an integral image 154 of the two-dimensional picture representation 152. As already described a closed curve approximating a border of the region is determined by the first determiner 153, such that the closed curve is a polygon comprising at least six axis parallel segments parallel to axes of the integral image 154. The measure 151 of the region (in the concrete example the sum of all pixels within a region) is determined by the second determiner 157 by alternately adding and subtracting values of the integral image 154 at vertices of the polygon.

Figure 13A:
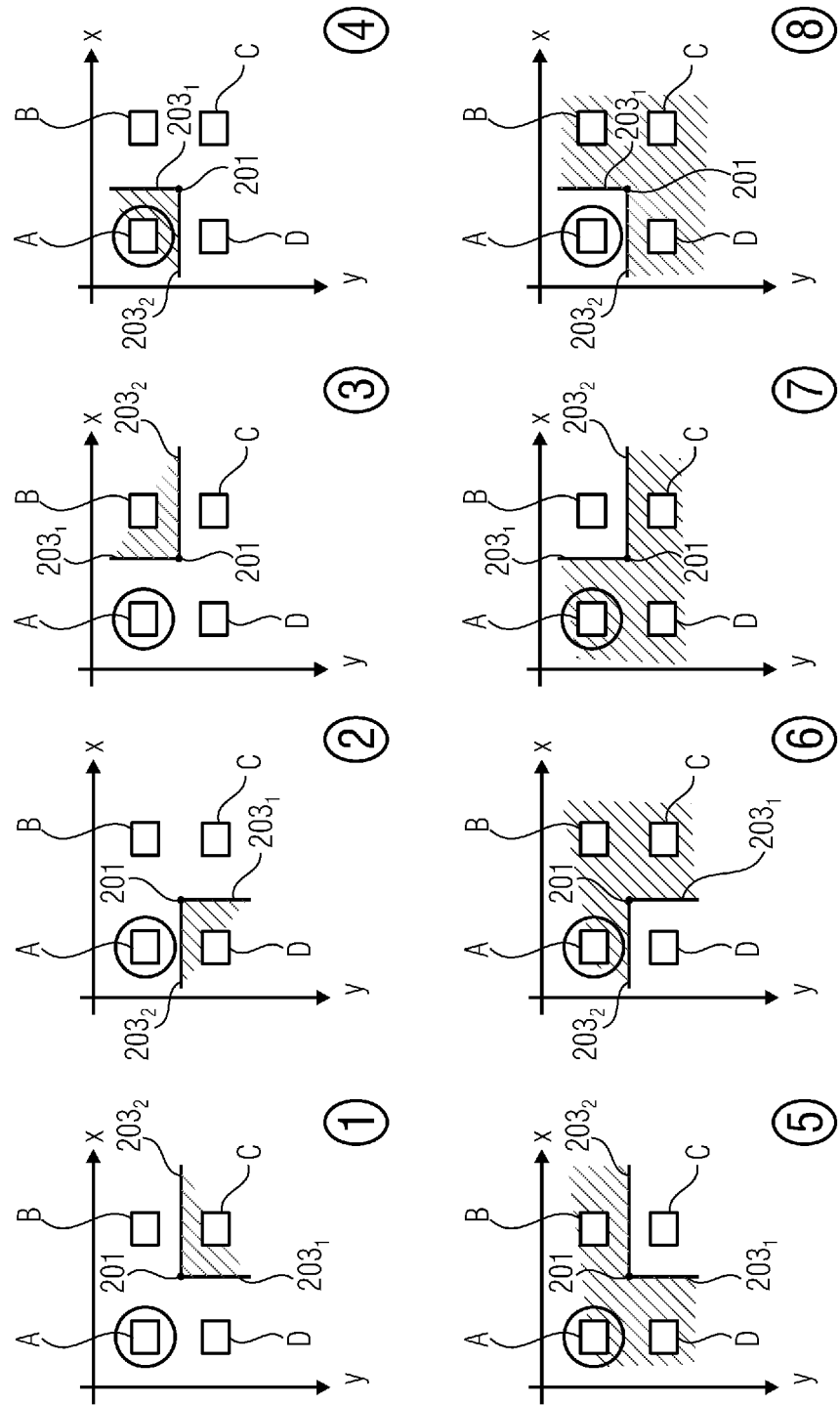
FIG. 13a shows an example on how to choose a value at a vertex for summing or subtracting to derive the measure of the region according to an embodiment.

FIG. 13a shows an example for the different possibilities of vertices of a polygon for approximating a border of the region and which of the values at the vertices is to be chosen to determine the measure 151 of the region. In the example shown in FIG. 13a a vertex 201 is surrounded by four values each having an x-coordinate and a y-coordinate of a two-dimensional xy-coordinate system, for example, of the integral image 154 and the two-dimensional picture representation 152. Therefore, for calculating the measure 151 of the region using the first determiner 153 each vertex offers different values to add or subtract to derive the measure 151 of the region. The vertex 201 connects a first axis parallel segment $203_1$ being parallel to the y-coordinate axis of the two-dimensional xy-coordinate system and a second axis parallel segment $203_2$ being parallel to an x-coordinate axis of the two-dimensional xy-coordinate system. The shaded areas in FIG. 13a symbolize inner areas of the polygon, i.e. the values in the shaded areas belong to the region for which the measure 151 is to be determined. From FIG. 13a it can be seen that for each vertex, the top left value A is taken to be added or subtracted to determine the measure 151 of the region. In other words, for a vertex of the polygon the value for adding or subtracting to determine the measure is chosen as the value of the integral image 154 neighboring the vertex and being associated to or having a preceding x-coordinate (rounded x-coordinate) and a preceding y-coordinate (rounded y-coordinate) relative to the vertex. In the integral image 154, typically the value with the preceding x- and y-coordinates is the smallest value of the four values A, B, C, D neighboring the vertex 201.

FIG. 13b shows how the sum of all pixels of a region $211_1$ of a two-dimensional picture representation 152 shown in the left side of FIG. 13b is determined using an integral image 154 of the two-dimensional picture representation 152, which is shown on the right side of FIG. 13b.

The two-dimensional picture representation 152 comprises a plurality of pixels, each pixel having a value and an associated x-coordinate and y-coordinate in a two-dimensional xy-coordinate system of the two-dimensional picture representation 152 and the integral image 154. The region $211_1$ is approximated by a closed curve $155_4$ comprising a plurality of axis parallel segments being parallel to the axis of the two-dimensional picture representation 152 and the integral image 152. It is a goal to derive as the measure of the region $211_1$ the sum of all pixels within the region $211_1$. According to the method 100 the measure of the region $211_1$ is determined by (the second determiner 157 by) alternately adding and subtracting values of the integral image 154 at vertices of the polygon (or the closed curve $155_4$) approximating the border of the region $211_1$.

From adding all pixel values within the region $211_1$, the sum of all pixels inside the region $211_1$ can be determined as 47.

From FIG. 13b on the right side it can be seen, how this sum of all pixels within the region $211_1$ can be derived by the second determiner 157 using the integral image 154 of the two-dimensional picture representation 152. From FIG. 13b it can be seen that the sum of all pixels is derived by alternately adding and subtracting values at vertices of the polygon (or the closed curve $155_4$). In the integral image 154 shown in FIG. 13b, for each vertex the value used to derive the measure of the region is marked with a circle and the algebraic sign (+ or −) used for the value is shown. Furthermore, it can be seen that when traveling along the closed curve $155_4$ for each vertex, a value is added or subtracted, wherein the value is added when the value of the preceding vertex was subtracted and the value is subtracted when the value of the preceding vertex was added. Furthermore, for determining the measure 151 of the region $211_1$, one has to travel along the closed curve $155_4$ once, such that for each vertex of the closed curve $155_4$ one value is added or subtracted.

Furthermore, from FIG. 13b it can be seen that in the case of the vertex lying at a border of the integral image, such that the value neighboring the vertex and being associated to or having a preceding x-coordinate and a preceding y-coordinate is outside the integral image, the value is chosen to be 0.

Traveling along the closed curve $155_4$ and adding and subtracting the values at the vertices of the closed curve $155_4$ results in the following equation:

$$1-6+0-0+15-13+33-44+82-55+42-8=47.$$

Hence, the sum of all pixels in the region $211_1$ is derived by alternately adding and subtracting the values at the vertices of the closed curve $155_4$.

Figure 13C:
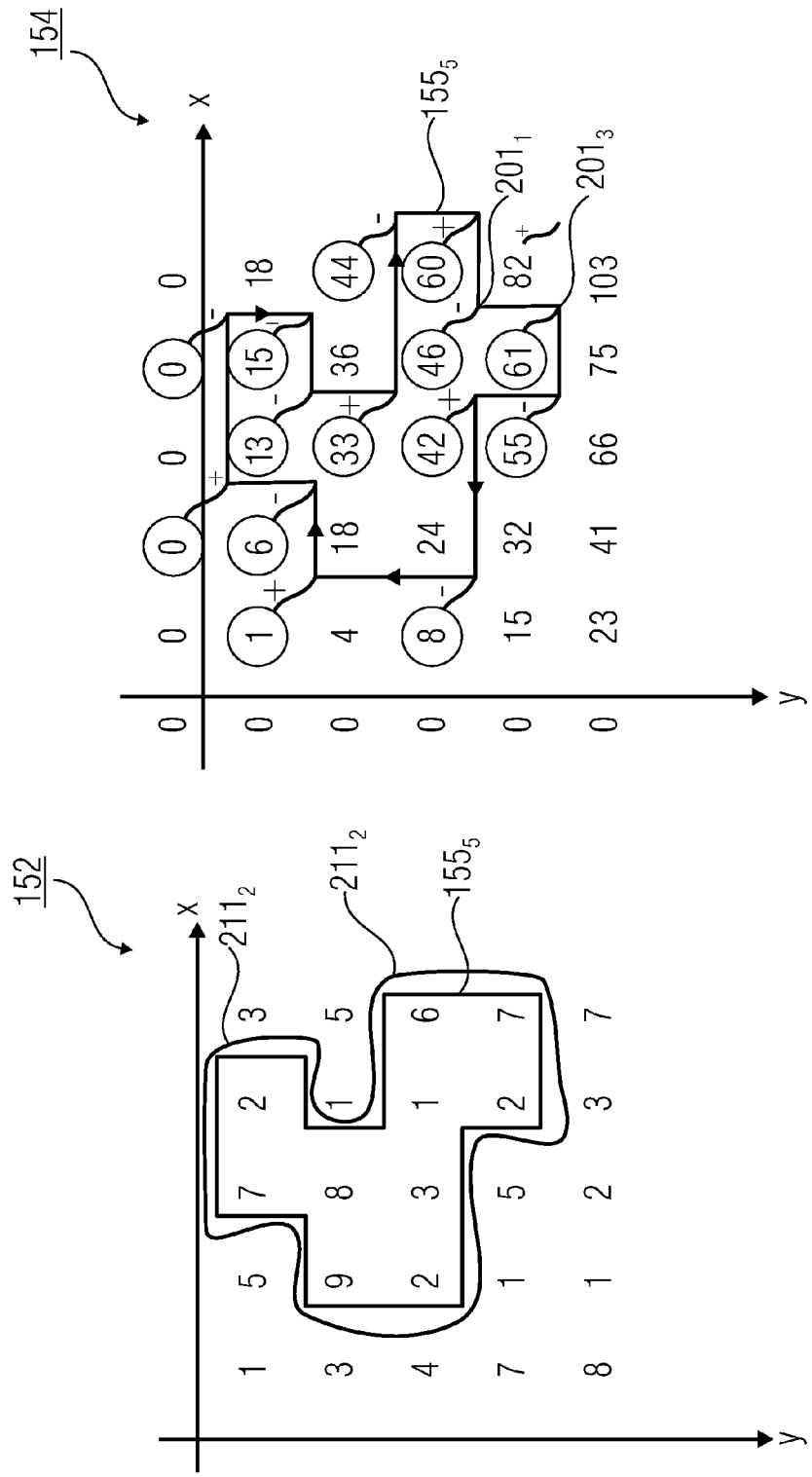
FIG. 13c shows the two-dimensional picture representation and the integral image from FIG. 12b with a changed region to be approximated.

Another example is shown in FIG. 13c, in which the region $211_1$ has been slightly changed. The new region $211_2$ shown in FIG. 13c does not enclose the pixel with the value 7, therefore, a sum of all pixels of the region $211_2$ equals 40, as can be seen from FIG. 13c. The integral image 154, of course, stays the same, as the two-dimensional picture representation 152 did not change. But as the region $211_2$ has been changed, the closed curve $155_4$ is changed by the first determiner 153, resulting in the new closed curve $155_5$ approximating the border of the new region $211_2$. This can be seen in the two-dimensional picture representation 152 shown on the left side of FIG. 13c and in the integral image 154 shown on the right side of FIG. 13c. As can be seen the change of the region results in a shift of a vertex $201_1$ in the x and the y direction, thereby generating two new vertices $201_2$, $201_3$. The sum of all pixels of the new region $211_2$ can be derived the same way as in FIG. 13b by traveling around the closed curve $155_5$, receiving the following equation:

$$1-6+0-0+15-13+33-44+60-46+61-55+42-8=40.$$

As has been described before, an advantage of the use of axis parallel segments instead of rectangles is the easy manipulation of the closed curve and an easy determination of a new measure of a changed region by only taking into account the vertices which changed because of the change of the region. In the example shown in FIGS. 13b and 13c, the sum of all pixels within the new region $211_2$ can easily be calculated by subtracting the value (82) of the changed vertex $201_1$ and by alternately adding and subtracting the values at the new vertex $201_2$, the changed vertex $201_1$ and the new vertex $201_3$ to and from the measure of the old region $211_1$. Therefore, the measure of the new region $211_2$ can easily be calculated as:

$$47-82+60-64+61=40,$$

which means much less computational efforts than adding and subtracting all values at the vertices again.

Or expressed in other words, the first determiner 153 may be configured to change vertices of the polygon (for example, in response to a changed region).

Furthermore the second determiner 157 may be configured to determine a measure of the changed region by subtracting and adding old values from and to the measure of the old region of vertices (for example, the vertex $201_1$), which are changed or removed by the first determiner 153, such that an old value (for example, +82) which has been added to determine the measure of the old region is subtracted from the measure of the old region and an old value which has been subtracted to determine the measure of the old region is added to the measure of the old region, and by alternately adding and subtracting new values (for example, +60, −46, +61) at changed vertices (for example, the changed vertex $201_1$) or new vertices (for example, the new vertices $201_2$, $201_3$) of the polygon to the measure of the old region.

In the following, it will be shown that this way of using arbitrary shapes in combination with the integral image offers a performance gain and flexibility for many applications.

Shape Capabilities

Using the described shape description, various properties of arbitrary image regions in a very fast, scalable and flexible ways can be obtained: As shown before, the shape can be applied on the integral image of the image that should be processed to calculate the sum of all pixel values in the region defined by the shape.

Moreover, if the shape is supplied on the integral image of an image with each pixel having the same value (1, or another value), the number of pixels (or multiplied by the value) enclosed by the shape can be obtained. With the sum of pixel values and the number of pixels in the shape the mean intensity or mean value of all the pixel values enclosed by the shape can be calculated very fast.

As an example, the apparatus 150 may be configured to determine a further integral image of the two-dimensional picture representation, with each pixel value of each pixel of the two-dimensional picture representation being set to the same value (for example, 1). And the apparatus 150 may be configured to determine a further measure of the region in the further integral image by alternately adding and subtracting of values of the further integral image being associated to the same coordinate positions as the values of the integral image used to determine the measure of the region, such that the further measure describes the number of pixels in the region. The mean value of all pixels of the region (enclosed by the closed curve) can then be calculated based on the measure of the region describing the sum of all pixels in the region and the further measure of the region describing the number of pixels in the region, by the apparatus 150.

Higher order moments and other features with additive properties can be considered as well to extract and describe properties of arbitrary image regions. The methods can be applied to graylevel or intensity images as well as to color images in arbitrary color spaces. In general, all kinds of images can be used in combination with this method. The shape can also be used in combination with integral histograms.

The shape representation is also perfectly suited to find or label all pixels enclosed by the shape in an image in a very efficient and easy way. Therefore, all pixels that correspond to vertices of the shape are marked in the image alternately with the shape label "+" and "−". In the following an example is described that steps through a bounding box and prints the indices of the pixels enclosed by the shape. Assuming without any loss of generality for the depicted algorithm shown in FIG. 18 the vertex closest to the origin is labeled with "+". Iterating line by line over a bounding box or an image the current pixel is labeled as "inside shape" if the algorithm is inside a "plus section" or if the pixel above is marked "inside shape" and if the algorithm currently is neither in a "plus section" nor a "minus section". Each line has an even number of labeled pixels. Two succeeding labeled pixels define a section where it becomes a "plus-section" if the first of these two pixels is labeled as "+" and a "minus section" if the first pixel is labeled as "−". To know whether the pixel above was labeled "inside shape" simply an array of length number of columns of the bounding box which holds this information is introduces. As a natural initial condition, the values of this area are set to not "inside shape". This algorithm can easily be extended to 3D volumes by slicing the shapes into the planes.

The two-dimensional picture representation can be, for example, a picture or a slice of a 3D volume.

Region-Based Object Model

In the following it will be shown how the shape representation using only axis parallel segments can be applied in a new region-based object model. It will be exemplified that the region-based matching scheme can, for example, be combined with a particle filter and lead to a very fast detection and tracking algorithm that is almost invariant to image noise.

Research on object detection, tracking and recognition has intensively been done in the last two decades. A good overview about object racking is given by Yilmaz et al. (A. Yilmaz, O. Javed, and M. Shah. Object tracking. ACM Computing Surveys, 38(4):13-es, 2006).

Various models and methods for object tracking have been proposed, e.g. primitive geometric shapes, contour or skeletal models among others (A. Yilmaz, O. Javed, and M. Shah. Object tracking. ACM Computing Surveys, 38(4):13-es, 2006.). Many of the detection and tracking algorithms rely on edges and feature points (S. Baker and I. Matthews. Lucas-Kanade 20 years on: A unifying framework: Part 1: The quantity approximated, the warp update rule, and the gradient descent approximation. International Journal of Computer Vision, 56(3):221-255, 2004.). However, edge and feature point detectors are sensitive to noise and therefore often tied to good image quality.

Han and Davis (B. Han and L. Davis. Robust observations for object tracking. In IEEE International Conference on Image Processing, volume 2, 2005.) proposed another robust tracking scheme. They approximated the object by a rectangle and assumed that a region that surrounds the object contains background. They used a particle filter and a log-likelihood ratio to track objects in likelihood images.

Model Scheme

The model and tracking scheme described in the following is not limited to rectangular regions. Moreover, it is not tied to likelihood images and does not absolutely necessitate the object to be surrounded by the background.

In the following, a region-based object model that is almost invariant to image noise is described. The proposed techniques can be adopted to 2D and 3D models with rigid or parametrizable shapes. The method can for example be applied on 3D face models with parametrizable facial actions.

FIG. 19 exemplifies a primitive 2D region based shape model that defines various regions with different characteristics of the enclosed regions. In general the model comprises a number of regions with corresponding characteristics and dependencies between the region characteristics.

The model can include closed curves $S_1, S_2, \ldots, S_m$, mappings $t_1, t_2, \ldots, t_m$, and comparison measures $C_1, C_2, \ldots, C_n$ and can be parameterized with a parameter vector x. The closed curves $S_i$ (2D or 3D) can for example be realized as polygons or parameterized geometric curves. In general any realization of these closed 2D- or 3D-curves $S_i$ that can be mapped to the shape representation $\tilde{S}_i$ with a mapping $t_i$ by transformation, projection and approximation is feasible. Therefore each mapping $t_i$ depends on the parameter vector x. A mapping $t_i$ that belongs to a 3D model can comprise, for example, a parameterized transformation and deformation of a 3D curve, the projection of the curve in the 2D image plane (using a camera model) and a subsequent approximation with the described shapes. The comparison measures $C_1$ to $CF_n$ rely on characteristics of regions enclosed by the shapes $\tilde{S}_i$ or on relations between characteristics of different regions. The object model 112, 212 mentioned above with respect to FIGS. 2A and 2B and various other places throughout this document may comprise, for example, the closed curves $S_1, \ldots S_m$ defined in an object-related frame of reference. Furthermore, the object model 112, 212 may comprise image values for the various regions that are delimited by the closed curves $S_1, \ldots S_m$. The model parameters 114, 214 of FIGS. 2A and 2B (and various other places throughout this document) may comprise the mappings $t_1, t_2, \ldots, t_m$. Thus, the mappings $t_1, t_2, \ldots, t_m$ may depend on a location and/or orientation of the object, on a location/orientation of the acquisition device, and on an acquisition geometry of the acquisition device.

The parameter vector x of a rigid 2D model for a specific traffic sign could for example be $x=\{x_c, y_c, s\}$, with x- and y-coordinates of the center of the sign and the size s of the sign within the image plane. The parameter vector of a deformable 3D-face model could comprise $x=\{x, y, z, \alpha, \beta, \gamma, a_1, a_2, \ldots, a_k\}$, with 3D-location x, y, z and rotation $\alpha, \beta, \gamma$ about the three coordinate axes and facial actions $a_1$ to $a_k$. The facial actions could be mouth opening, eyes opening, gaze or any facial action known from the facial action coding system (FACS). Moreover any state variables like speed or acceleration could be part of the parameter vector. In general any valid parametrization of the model is feasible. The model or shape deformations can also be subject to constraints. For example only realistic or specific deformations could be allowed. Unrealistic deformations during tracking or optimization could be penalized in the objective function of the optimization scheme.

The curves $S_1$ to $S_m$ enclose regions of the object that can be mapped to $\tilde{S}_1$ to $\tilde{S}_m$ and used by the comparison measures $C_1$ to $C_n$ to match the image with the model. Shapes may overlap or enclose other shapes and characteristics of regions between two or more shapes can be evaluated by the comparison measures (see also FIG. 19).

The comparison measures $C_1$ to $C_n$ can evaluate characteristics of individual regions defined by the mapped shapes $\tilde{S}_1$ to $\tilde{S}_m$. They can also evaluate or compare characteristics of two or more regions. For example they could compare the mean intensities, variances or color characteristics of two or more regions. The comparison measures $C_1$ to $C_n$ correspond to or are related to the similarity measures mentioned above (e.g. in the context of the description of FIGS. 2A and 2B).

A specific measure could compare the mean intensities of two regions and produce higher response for higher differences between the mean intensities. Any measure that produces higher responses for more different feature values (e.g. intensities or variances) can be used to model differences. Also measures that produce only responses if the characteristic (e.g. intensity or variance) of one region is greater (or less) than that of another region can be used. Measures that produce higher responses for more similar characteristics can be used to model equalities. Also measures that compare region characteristics with predefined model specific characteristics can be applied. The measures could also provide probabilities or likelihoods that the characteristics of the regions of the object or image under test belong to the object that is modeled, searched or tracked.

A combination of various or of all the measures can be used for the overall match of the parameterized model with the image. In the traffic sign example of FIG. 19 the overall match could for example comprise and evaluate the following dependencies:

Mean intensity of region $R_2$ is higher than mean intensity of region $R_1$.

Mean intensity of region $R_3$ equals mean intensity of region $R_4$.

Mean intensities of region $R_3$ and $R_4$ are lower than mean intensity of region $R_2$.

The sum of pixel values in regions defined by more than one shape can be calculated by adding or subtracting the sum of pixel values defined by individual shapes. For example the sum of pixel values of region $R_1$ is the sum of all pixel values enclosed by $S_1$ minus the sum of all pixel values enclosed by $S_2$. The same holds for the other characteristics.

Detection, Tracking and Recognition

Detection, tracking and recognition of objects can be conducted by a combination of the model scheme with any optimization or state estimation algorithm.

For example a particle filter (B. Ristic, S. Arulampalam, and N. Gordon. Beyond the Kalman filter: particle filters for tracking applications. Artech House, Boston Mass., 2004.) can be used in combination with the described model to detect, track and recognize objects in images. Therefore the state or parameter vector x is estimated by the particle filter. The particles are initialized randomly or with a priori knowledge. The prediction step can be modeled according to a specific motion, deformation or state evolution model. The update step incorporates the overall match of the model (combination of comparison measures) with the image in the measurement model. Therefore the closed curves of the model are mapped and approximated with our shapes in the image and the necessitated characteristics of the regions enclosed be the shapes are extracted and used for the overall match (e.g. comparison of the mean intensities of the enclosed regions).

Automatic Model Generation with Samples

Object models can also be generated automatically with sample images of the objects. Therefore different regions of the object are automatically segmented in the image using for example the proposed image segmentation methods. Shapes of the object regions and comparison measures that are generated on basis of the sample images can be included in the object model.

Extension to Higher Dimensions

The described methods, models and applications for two-dimensional shapes can be extended to (discrete) three dimensional volumes or even n-dimensional hypervolumes. For a discrete n-dimensional hypervolume the integral hypervolume representation V (x) can be calculated as $$V(x) = \sum_{x_1' < x_1} \sum_{x_2' < x_2} \ldots \sum_{x_n' < x_n} P(x) \text{ with } x \equiv \begin{pmatrix} x_1 \\ \vdots \\ x_n \end{pmatrix}$$

P (x) is the pixel value or a simple feature that is summed up to point x in the n-dimensional space. In the n-dimensional space the shapes are also n-dimensional and are described by n-dimensional vertices. The simplest form consists of $\tilde{S}=\{x_1, x_2, \ldots, x_m\}$ whereas $x_i$ is the i-th n-dimensional vertex of the shape.

An example for the three-dimensional case is the computer generated volume of a CT or NMR-image. An example for the four-dimensional case is an added time dimension describing the development of the image for discrete points in time. The shapes in multidimensions can be used in a similar way as in 2 dimensions for segmentation, tracking and classification.

Applications

In the following sample applications and examples on how the described methods may be used will be described.

Tracking in Likelihood Images

Likelihood images are used for describing the probability of a certain occurrence (e.g. the occurrence of an object or a pattern within an image with respect to the location in the image). Each point of the image contains a number with the probability of the occurrence. The described methods can be used for detecting the area with the highest likelihood for the searched pattern or object.

Image Segmentation

Image segmentation can be conducted for example with an initial or random shape (for example a rectangle) that is iteratively adapted to the region by optimizing an error criterion (objective function). Adaptation of the shape can be done by random or directed shape modifications in combination with an arbitrary optimization or state estimation scheme (e.g. particle filter, Kalman filter, genetic algorithms, steepest descent, downhill simplex, . . . ). The objective function could compare characteristics of the inner and outer region defined by the shape. Also shape evolution probabilities could be used, to manipulate the shape in a specific way (e.g. using a priori knowledge about the region that is to be segmented. It is also feasible to optimize each single segment independently of each other, using such an optimization scheme. A coarse to fine optimization scheme is applicable that starts with an initial coarse shape (e.g. rectangular region) that is refined and adapted to the interesting image region by adding or removing segments or altering the shape in any other valid way. Adding segments can be used to specify the interesting image region with arbitrary precision or performance. Segments of fixed (maximum) length can be used as well as adaptive segment lengths. For example, horizontal and vertical borders can be approximated with single segments, whereas 45° rotated borders or fragmented borders can be approximated with many segments.

Infinite Feature Pool for Object Classification

While local features are often calculated on rectangular areas (e.g. Haar features used for face detection) it is also possible to use almost random shapes for creating the features. Thus almost arbitrary and random features can be created. The advantage is that the areas where the features are calculated can be adapted in a way so that they fit much better to the pattern that is to be detected. Besides using the image pixels themselves also other derived (low-level) features can be used. Examples are the second and further momentum or the local contrast (e.g. using the Sobel or Laplacian operator).

Doing so results in an enormously rich feature pool that can be used for further training and classification steps.

Generation of Parameterized Shapes

Shapes may be designed without constraints. But certain constraints may improve speed and convergence in finding an optimal solution. Possible constraints are:

shapes have to be self-avoiding with no self-crossings allowed, shapes consist of a minimum of A and a maximum of B vertices, with A and B being pre-defined values, shapes are constructed from pre-defined and parametrizable forms. Example are circles, ellipses with pre-given sizes and eccentricity ranges or complex pre-defined "elastic" shapes with weights and penalty terms describing the form, shapes derived from a 3D model using projection to achieve 2D-shapes.

These shapes can be used for approximating and matching patterns and regions. A concrete use case could be a 3D face model (-mesh).

Non-Rigid Generic 2D/3D Region-Based Models

The methods can be used for detection, tracking and recognition of objects in images using region-based models as described in more detail above.

Concrete Examples

Some applications that can be treated with the described methods are pupil tracking, facial feature tracking, traffic sign recognition, optical character recognition.

The pupil within the eye can be modeled as a dark circular region surrounded by brighter surroundings. Thus, it can be detected using circular shapes and with a constraint of having darker pixels inside the shape and brighter ones outside. Methods according to embodiments of the present application also work on graylevel images (as the two-dimensional picture representation). The pupil is modeled by a circular shape approximation. It could be demonstrated by suitable experiments conducted by the inventors that the method even works with images having a high level of artificial noise.

Other facial features can be tracked using certain heuristics like the mouth region. Even wrinkles can be detected using a model that sums up not pixels but low level features describing the contrast like the locale variance.

Traffic signs can be modeled using the exact (or a sufficiently exact) knowledge about their shape and texture. From the texture certain pixel value distributions can be derived that can be used for combining several subshapes with rules on how their subcontents are related to each other. Projecting the known real traffic-shape as a 3D-shape to the image using 3D→2D-transforms makes it possible to detect signs even from different points of views/angles.

Another application is Optical Character Recognition (OCR). Here, every single letter can be modeled using shapes.

The described shape representation and the model scheme have several advantages and beneficial properties, some of them will be named in the following.

The described methods can be implemented very fast on standard hardware and are also well suited for parallelization on graphic cards. Even calculation of the integral image can be parallelized on the GPU (summing up column by column first and then line by line). The proposed shape representation is highly scalable in terms of vertex count and precision of the approximation. The proposed shape descriptors are very flexible and can be manipulated very easy. Arbitrary regions described by polygons or parameterized curves can be approximated very easy. The performance of the proposed methods is almost invariant to the image size. The proposed region-based tracking scheme is very robust to noise. The properties of the regions defined by the shapes can be calculated with subpixel precision, by looking up in the integral image with subpixel precision (interpolation).

To summarize, the embodiments provide a fast method to calculate characteristics of arbitrary image regions with flexible shape descriptors and integral images. Moreover, a region based model to describe objects has been described. Furthermore, a matching scheme for robust detection, tracking and recognition of objects in images using 2D or 3D region-based object models have been described. Furthermore, sample applications, extensions and generalizations of the method/approach have been described. Furthermore, the advantages of the proposed methods have been depicted and compared with state-of-the-art techniques.

Furthermore, an efficient shape representation for arbitrary image regions that can be used to calculate the sum of pixel values in the image region defined by the shape has been described and the advantages of this shape representation have been shown and compared with the drawbacks of the rectangle-based approximation.

Furthermore, applications, for example in the field of segmentation and tracking of non-rigid objects using the flexible shape representation that can be manipulated in an easy way have been shown. Furthermore, generalizations to higher dimensions have been described.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] O. C. Au. Automatic white balancing using luminance component and standard deviation of rgb components [image preprocessing]. 2004 IEEE International Conference on Acoustics Speech and Signal Processing, pages iii-493-6, 2004. 2

[2] D. C. Brown. Calibration of close range cameras. International Archives of Photogrammetry, 19, 1972. 1

[3] R. Cipolla, T. Drummond, and D. Robertson. Camera calibration from vanishing points in images of architectural scenes, volume 2, pages 382-391. Citeseer, 1999. 1

[4] F. Devernay and O. Faugeras. Automatic calibration and removal of distortion from scenes of structured environments. Proceedings of SPIE, 2567(1):62-72, 1995. 1

[5] M. T. El-melegy. Nonmetric lens distortion calibration: closed-form solutions, robust estimation and model selection. Proceedings Ninth IEEE International Conference on Computer Vision, (Iccv):554-559 vol. 1, 2003. 1

[6] O. D. Faugeras, Q. T. Luong, and S. J. Maybank. Camera Self-Calibration: Theory and Experiments, volume 588, pages 321-334. Springer-Verlag, 1992. 1

[7] G. D. Finlayson, S. D. Hordley, and P. M. HubeL. Color by correlation: a simple, unifying framework for color constancy. IEEE Transactions on Pattern Analysis and Machine Intelligence, 23(11):1209-1221, 2001. 2

[8] D. Guru. A simple and robust line detection algorithm based on small eigenvalue analysis. Pattern Recognition Letters, 25(1):1-13, January 2004. 1

[9] R. Hartley and A. Zisserman. in computervision multiple view geometry in computer vision. Computer-Aided Design, 16(2):279-309, 2003. 2

[10] R. I. Hartley. Estimation of relative camera positions for uncalibrated cameras. Compute, 92(1):579-587, 1992. 2

[11] E. E. Hemayed. A survey of camera self-calibration. Proceedings of the IEEE Conference on Advanced Video and Signal Based Surveillance 2003, pages 351-357, 2003. 1

[12] M. Jackowski, A. Goshtasby, S. Bines, D. Roseman, and C. Yu. Correcting the geometry and color of digital images. IEEE Transactions on Pattern Analysis and Machine Intelligence, 19(10):1152-1158, 1997. 2

[13] M. K. Johnson and H. Farid. Exposing digital forgeries through chromatic aberration. Proceeding of the 8th workshop on Multimedia and security MMSec 06, (2):48, 2006. 2

[14] E. Y. Lam. Combining gray world and retinex theory for automatic white balance in digital photography, pages 134-139. Ieee, 2005. 2

[15] H.-k. Lam, 0. C. Au, and C.-w. Wong. Automatic white balancing using standard deviation of RGB components, volume 3, pages III-921-4 Vol. 3. IEEE, 2004. 2

[16] H. C. Longuet-Higgins. A computer algorithm for reconstructing a scene from two projections. Nature, 293(5828):133-135, 1981. 2

[17] T. Luhmann, H. Hastedt, and W. Tecklenburg. Modelling of chromatic aberration for high precision photogrammetry. Evaluation, XXXVI (September):173-178, 2006. 2

[18] D. Nikitenko, M. Wirth, and K. Trudel. Applicability of white-balancing algorithms to restoring faded colour slides: An empirical evaluation. Journal of Multimedia, 3(5):9-18, 2008. 2

[19] Y. Peng, A. Ganesh, and S. Member. Rasl: Robust alignment by sparse and low-rank decomposition for linearly correlated images. Image Rochester N.Y., (July):1-30, 2010. 1

[20] B. Triggs. Autocalibration from planar scenes. Structure, 1(10:89-105, 1998. 1

[21] R. Y. Tsai. A versatile camera calibration technique for high accuracy 3d machine vision metrology using off-the-shelf tv cameras and lenses. IEEE Journal of Robotics and Automation, RA-3(4):323-344, 1987. 1

[22] C.-c. Weng, H. Chen, and C.-s. Fuh. A novel automatic white balance method for digital still cameras. 2005 IEEE International Symposium on Circuits and Systems, pages 3801-3804, 2005. 2

[23] W. Yu. Practical anti-vignetting methods for digital cameras. IEEE Transactions on Consumer Electronics, 50(4):975-983, 2004. 2

[24] Z. Zhang. Flexible camera calibration by viewing a plane from unknown orientations. In Computer Vision, 1999. The Proceedings of the Seventh IEEE International Conference on, volume 1, pages 666-673. Ieee, 1999. 1

[25] Z. Zhang. Camera calibration with one-dimensional objects. IEEE Transactions on Pattern Analysis and Machine Intelligence, 26(7):892-9, 2004. 1

[26] Z. Zhang. Camera calibration with lens distortion from low-rank textures. Camera, pages 2321-2328, 2011. 1

[27] Y. Zheng, S. Lin, C. Kambhamettu, J. Yu, and S. B. Kang. Single-image vignetting correction. Pattern Analysis and Machine Intelligence IEEE Transactions on, 31(12):2243-2256, 2009. 2

[28] P. Viola and M. Jones, Rapid object detection using a boosted cascade of simple features, in IEEE Conference on Computer Vision and Pattern Recognition, volume 1, pages 511-518, Kauai, Hi., USA, April 2001

[29] Z. Yin and R. T. Collins, Object tracking and detection after occlusion via numerical hybrid local and global mode seeking, in Computer Vision and Pattern Recognition, 2008. CVPR 2008. IEEE Conference on, page 1-8, 2008

[30] D. Mohr and G. Zachmann, FAST: fast adaptive silhouette area based template matching, in Proceedings of the British Machine Vision Conference, pages 39.1-39.12, 2010

[31] S. Baker and I. Matthews. Lucas-Kanade 20 years on: A unifying framework: Part 1: The quantity approximated, the warp update rule, and the gradient descent approximation. International Journal of Computer Vision, 56(3):221-255, 2004

[32] B. Han and L. Davis. Robust observations for object tracking. In IEEE International Conference on Image Processing, volume 2, 2005

[33] B. Ristic, S. Arulampalam, and N. Gordon. Beyond the Kalman filter: particle filters for tracking applications. Artech House, Boston Mass., 2004

[34] A. Yilmaz, O. Javed, and M. Shah. Object tracking. ACM Computing Surveys, 38(4):13-es, 2006

The invention claimed is:

1. Apparatus for determining model parameters, the apparatus comprising:
    an object model transformer configured to receive an object model of a known object, to perform a transformation of the object model based on a set of model parameters from a first frame of reference to a second frame of reference, to determine as result of this transformation a transformed object model comprising at least one region, the at least one region being associated to an object region of the object, and to perform an image value transformation;
    a region comparator configured to receive the transformed object model and an image depicting the object, to determine for a selected region of the transformed object model a region-related similarity measure representative of a similarity between the selected region and an image section of the image associated to the selected region via a transformation-dependent mapping, wherein the similarity measure comprises a geometric similarity component and an image value similarity component; and
    a model parameter determiner configured to determine an updated set of model parameters on the basis of the region-related similarity measure and an optimization scheme.

2. Apparatus according to claim 1, wherein the object model comprises a data structure describing the at least one region by means of geometric properties and wherein the object model transformer is configured to transform the geometric properties to transformed geometric properties of the transformed object model.

3. Apparatus according to claim 1, wherein the region comparator is configured to integrate characteristic values of the image over the selected region.

4. Apparatus according to claim 1, wherein the region comparator is configured to evaluate at least one integral image of the image for determining the region-related similarity measure.

5. Apparatus according to claim 1, wherein the region comparator is configuerdt to approximate boundaries of the selected region by a closed curve comprising curve segments that are parallel to coordinate axes of the image.

6. Apparatus according to claim 1, wherein the region comparator is configured to evaluate the image section using the discrete Green's theorem, wherein a boundary of the image section used for the discrete Green's theorem is based on a polygonal approximation of a boundary of the selected region.

7. Apparatus according to claim 1, wherein the region comparator is configured to determine at least one statistical moment of the image for the selected region and to determine the region-related similarity measure on the basis of the at least one statistical moment.

8. Apparatus according to claim 7, wherein the region comparator is configured to determine a mean image value on the basis of the at least one statistical moment, wherein the mean image value is compared with an expected image value associated with the selected region to acquire a corresponding comparison result the similarity measure being determined on the basis of, at least, the comparison result.

9. Apparatus according to claim 8, wherein the region comparator is configured to determine a uniformity measure on the basis of the at least one statistical moment or a further statistical moment, wherein the uniformity measure indicates how well the image section is aligned with the selected region, the similarity measure being determined on the basis of, at least, the uniformity measure.

10. Apparatus according to claim 1, wherein the object model describes a plurality of regions corresponding to a plurality of object regions of the object, wherein the region comparator is configured to iterate the selected region over at least a subset of the plurality of regions of the object model and to determine a combined similarity measure on the basis of a plurality of region-related similarity measures.

11. Apparatus according to claim 1, wherein the object comprises a plurality of shade or color regions, each shade or color region comprising a unique shade or color, and wherein the selected region is one of the plurality of shade or color regions.

12. Apparatus according to claim 1, wherein the optimization scheme performs at least one optimization step of one of the Levenberg-Marquardt algorithm, a particle filter, Downhill-Simplex, a genetic algorithm, a gradient descent algorithm, or a combination of any of these.

13. Apparatus according to claim 1, the apparatus being configured to repeat a parameter determination performed by the object model transformer, the region comparator, and the model parameter determiner on the basis of the updated set of model parameters.

14. Apparatus according to claim 1, wherein the object is one of a calibration chart, a calibration object, and a standardized object.

15. Apparatus according to claim 1, wherein the image is a camera image acquired using a camera to be calibrated, wherein the model parameters comprise camera parameters describing at least partially how the object model is transformed from the first frame of reference to the camera-related second frame of reference, and wherein the model parameter determiner is configured to determine updated camera parameters as part of the updated set of model parameters.

16. Apparatus according to claim 1, wherein the apparatus is configured for detecting or tracking the object and the model parameters describe at least one of a current position and a current orientation of the object.

17. Method for determining model parameters using a known object, the method comprising:
receiving an object model of the object;
transforming the object model based on a set of model parameters from a first frame of reference to a second frame of reference, to determine as result of this transformation a transformed object model comprising at least one region, the at least one region being associated to at least one object region of the object, wherein transforming the object model includes an image value transformation;
receiving an image depicting the object;
determining for a selected region of the transformed object model a region-related similarity measure representative of a similarity between the selected region and an image section of the image associated to the selected region via a transformation-dependent mapping, wherein the similarity measure comprises a geometric similarity component and an image value similarity component; and
determining an updated set of model parameters on the basis of the region-related similarity measure and an optimization scheme.

18. Method according to claim 17, wherein the object model comprises a data structure describing the at least one region by means of geometric properties, and wherein transforming the object model comprises transforming the geometric properties to transformed geometric properties of the transformed object model.

19. Method according to claim 17, further comprising:
integrating characteristic values of the image over the selected region prior to determining the region-related similarity measure.

20. Method according to claim 17, wherein determining the region-related similarity measure comprises evaluating at least one integral image of the image for determining the region-related similarity measure.

21. Method according to claim 17, wherein determining the region-related similarity measure comprises approximating boundaries of the selected region by a closed curve comprising curve segments that are parallel to coordinate axes of the image.

22. Method according to claim 17, wherein determining the region-related similarity measure comprises evaluating the image section using the discrete Green's theorem, wherein a boundary of the image section used for the discrete Green's theorem is based on a polygonal approximation of a boundary of the selected region.

23. Method according to claim 17, wherein determining the region-related similarity measure comprises determining at least one statistical moment of the image for the selected region and to determine the region-related similarity measure on the basis of the at least one statistical moment.

24. Method according to claim 23, wherein determining the region-related similarity measure comprises determine a mean image value on the basis of the at least one statistical moment, wherein the mean image value is compared with an expected image value associated with the selected region to acquire a corresponding comparison result, the similarity measure being determined on the basis of, at least, the comparison result.

25. Method according to claim 23, wherein determining the region-related similarity measure comprises determine a uniformity measure on the basis of the at least one statistical moment or another statistical moment, wherein the wherein the uniformity measure indicates how well the image section is aligned with the selected region, the similarity measure being determined on the basis of, at least, the uniformity measure.

26. Method according to claim 17, wherein the object model describes a plurality of regions corresponding to a plurality of object regions of the object, the method further comprising:
iterating the selected region over at least a subset of the plurality of regions of the object model; and
determining a combined similarity measure on the basis of a plurality of region-related similarity measures.

27. Method according to claim 17, wherein the object comprises a plurality of shade or color regions, each shade or color region comprising a unique shade or color, and wherein the selected region is one of the plurality of shade or color regions.

28. Method according to claim 17, wherein the optimization scheme is one of the Levenberg-Marquardt algorithm, a particle filter, Downhill-Simplex, a genetic algorithm, a gradient-descent algorithm, or a combination of any of these.

29. Method according to claim 17, wherein the object is one of a calibration chart, a calibration object, and a standardized object.

30. Method according to claim 17, wherein the image is a camera image acquired using a camera to be calibrated, wherein the model parameters comprise camera parameters describing at least partially how the object model is transformed from the first frame of reference to the camera-related second frame of reference, and wherein determining the updated set of model parameters comprises determining updated camera parameters as part of the updated set of model parameters.

31. Method according to claim 17, wherein the method is a method for detecting or tracking the object and the model parameters describe at least one of a current position and a current orientation of the object.

32. A non-transitory computer readable medium including a computer program comprising a program code for performing, when running on a computer, a method according to claim 17.

* * * * *

UNITED STATES PATENT AND TRADEMARK OFFICE
CERTIFICATE OF CORRECTION

PATENT NO. : 8,768,046 B2  
APPLICATION NO. : 13/970986  
DATED : July 1, 2014  
INVENTOR(S) : Andreas Ernst et al.

Page 1 of 1

It is certified that error appears in the above-identified patent and that said Letters Patent is hereby corrected as shown below:

Please correct item (72) on the title page of the patent as follows:

"…Joern Thielecke…"

Signed and Sealed this  
Twenty-fifth Day of November, 2014

Michelle K. Lee  
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,768,046 B2 |
| APPLICATION NO. | : 13/970986 |
| DATED | : July 1, 2014 |
| INVENTOR(S) | : Andreas Ernst et al. |

Page 1 of 1

It is certified that error appears in the above-identified patent and that said Letters Patent is hereby corrected as shown below:

Please correct item (72) on the title page of the patent as follows:

fifth inventor, should read,

"…Joern Thielecke…"

This certificate supersedes the Certificate of Correction issued November 25, 2014.

Signed and Sealed this
Twenty-third Day of December, 2014

Michelle K. Lee
*Deputy Director of the United States Patent and Trademark Office*